US008904358B1

(12) United States Patent
Peri-Glass et al.

(10) Patent No.: US 8,904,358 B1
(45) Date of Patent: Dec. 2, 2014

(54) METHODS, SYSTEMS, AND ARTICLES OF MANUFACTURE FOR SYNCHRONIZING SOFTWARE VERIFICATION FLOWS

(75) Inventors: Yaron Peri-Glass, Raanana (IL); Shabd Swarup V, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 1139 days.

(21) Appl. No.: 12/796,387

(22) Filed: Jun. 8, 2010

(51) Int. Cl.
G06F 9/44 (2006.01)
G06F 11/36 (2006.01)

(52) U.S. Cl.
CPC ........ *G06F 11/3608* (2013.01); *G06F 11/3604* (2013.01)
USPC ........................................................ 717/126

(58) Field of Classification Search
CPC ............ G06F 11/3604; G06F 11/3608; G06F 11/3684; G06F 11/3688; G06F 9/44589
USPC .......................................... 717/126; 715/704
See application file for complete search history.

(56) References Cited

U.S. PATENT DOCUMENTS

| 5,600,789 | A | * | 2/1997 | Parker et al. ................ 714/38.11 |
| 5,918,037 | A |  | 6/1999 | Tremblay |
| 6,854,089 | B1 | * | 2/2005 | Santee et al. ................... 715/783 |
| 6,907,599 | B1 |  | 6/2005 | Kashai et al. |
| 6,944,848 | B2 |  | 9/2005 | Hartman |
| 7,024,345 | B1 |  | 4/2006 | Stamm |
| 7,774,746 | B2 |  | 8/2010 | Mansfield et al. |
| 7,827,532 | B2 | * | 11/2010 | Rosaria et al. ................. 717/125 |
| 7,913,231 | B2 |  | 3/2011 | Stienhans |
| 7,958,454 | B2 |  | 6/2011 | Gaudette |
| 8,387,005 | B1 |  | 2/2013 | Ghosh-Roy et al. |
| 8,433,550 | B2 |  | 4/2013 | Theaume |
| 8,510,718 | B2 |  | 8/2013 | Hemade |
| 8,549,483 | B1 |  | 10/2013 | Bridges et al. |
| 2002/0156608 | A1 |  | 10/2002 | Armbruster et al. |
| 2005/0060132 | A1 |  | 3/2005 | Hollander et al. |
| 2006/0156274 | A1 |  | 7/2006 | Andreev et al. |

(Continued)

FOREIGN PATENT DOCUMENTS

EP        1372086  A1  *  12/2003

OTHER PUBLICATIONS

Yuanhua Liu, Anna-Lisa Osvalder and MariAnne Karlsson (2010). Considering the Importance of User Profiles in Interface Design, User Interfaces, Rita Matrai (Ed), InTech, Available from: http://www.intechopen.com/books/user-interfaces/considering-the-importance-of-user-profiles-in-interfacedesign. Last retrieved Jul. 26, 2013.*

(Continued)

*Primary Examiner* — Qing Chen
*Assistant Examiner* — Andrew M Lyons
(74) *Attorney, Agent, or Firm* — Vista IP Law Group, LLP

(57) ABSTRACT

Disclosed are methods, systems, and articles of manufacture for synchronizing a software verification flow of an application under test (AUT) that uses a user interface. Various embodiments of the methods identify generic application programming interface(s) (API(s)), map menu items of the AUT to logical names, and generate generated API(s) based on the generic API(s) and the mapping results. Some embodiments further generate a custom API by using generated API(s) and implement synchronization accordingly. Some embodiments are directed at a hardware system for performing various methods, while some other embodiments are directed at an article of manufacture for storing a sequence of instructions for various methods disclosed herein.

30 Claims, 13 Drawing Sheets

(56) References Cited

U.S. PATENT DOCUMENTS

| | | | |
|---|---|---|---|
| 2007/0033441 A1* | 2/2007 | Sathe et al. | 714/38 |
| 2008/0052690 A1 | 2/2008 | Bharadwaj | |
| 2008/0263506 A1 | 10/2008 | Broadfoot et al. | |
| 2008/0263511 A1 | 10/2008 | Shapiro | |
| 2009/0089725 A1 | 4/2009 | Khan | |
| 2010/0162214 A1 | 6/2010 | Hoff | |
| 2010/0211934 A1 | 8/2010 | Simons et al. | |
| 2011/0173603 A1* | 7/2011 | Nakamura et al. | 717/173 |
| 2012/0233582 A1 | 9/2012 | Ardeishar et al. | |

OTHER PUBLICATIONS

World of Computing, Artificial Intelligence, Heuristic Search, Dec. 14, 2009, last retrieved from http://intelligence.worldofcomputing.net/ai-search/heuristic-search.html# on Jul. 26, 2013.*

World of Computing, Artificial Intelligence, Depth First Search, Dec. 18, 2009, last retrieved from http://intelligence.worldofcomputing.net/ai-search/depth-first-search.html on Jul. 26, 2013.*

Architecture for Automated Graphical User Interface Tests to Maximize Reuse, IBM, Jun. 30, 2006, IPCOM000137946D.*

Non-Final Office Action dated Jan. 16, 2013 for U.S. Appl. No. 12/796,361.

Final Office Action dated Dec. 5, 2012 for U.S. Appl. No. 12/143,174.

Mark S. Miller, "Block Structure", 1999, URL: http://www.erights.org/elang/blocks/index.html.

Mark S. Miller, "Expression Grammar", 1999, URL: http://www.erights.org/elang/grammar/expr.html.

Mark S. Miller, "Kernel-E Reference", 1999, URL: http://www.erights.org/elang/kernel/index.html.

Mark S. Miller, "Lexical Grammar", 1999, URL: http://www.erights.org/elang/grammar/lexical.html.

Mark S. Miller, "Methods and Matchers", 1999, URL: http://www.erights.org/elang/grammar/dispatchee.html.

Mark S. Miller, "Pattern Grammar", 1999, URL: http://www.erights.org/elang/grammar/patterns.html.

Mark S. Miller, "Primitive Expressions", 1999, URL: http://www.erights.org/elang/grammar/prim-expr.html.

Mark S. Miller, "Quasi-Literals", 1999, URL: http://www.erights.org/elang/grammar/quasi-overview.html.

Verisity, "e Language Reference Manual", 1998.

Non-Final Office Action for U.S. Appl. No. 12/796,361 Mailed on Aug. 7, 2012.

Non-Final Office Action for U.S. Appl. No. 12/143,174 Mailed on Jul. 31, 2012.

Edwards, Stephan A., "Design and Verification Languages", Nov. 2004.

Final Office Action dated Jun. 13, 2013 for U.S. Appl. No. 12/796,361.

Non-Final Office Action dated Apr. 11, 2013 for U.S. Appl. No. 12/143,174.

"RTL Hardware Desing Using VHDL: Coding for Effeiency, Portability, and Scalability" by Pong P. Chu, Jun. 12, 2006, p. 313, [online],[retrieved on Mar. 20, 2013]. Retrieved from <http://academic.csuohio.edu/chu_p/rtl/chu_rtl_book!rtl_chap1 O_fsm.pdf>.

IEEE, "http://academic.csuohio.edu/chu_p/rtl/chu_rtl_book!rtl_chap1 O_fsm.pdf" by Tsun S. Chow, Sep. 18, 2006, pp. 1-10, [online], [retrieved on Mar. 20, 2013]. Retrieved from <http://ieeexplore. ieee.org/stamp/stamp.jsp ?tp=&arnu mber= 170251 9>.

Final Office Action dated Oct. 2, 2013 for U.S. Appl. No. 12/143,174.

Non-Final Office Action dated Sep. 27, 2013 for U.S. Appl. No. 12/796,361.

Notice of Allowance dated Mar. 20, 2014 for U.S. Appl. No. 12/796,361.

Sakunkonchak et al., Synchronization verification in system-level design with ILP solvers, Jul. 2005, 10 pages.

Non-Final Office Action dated Mar. 12, 2014 for U.S. Appl. No. 12/143,174.

Final Office Action dated Jul. 16, 2014 for U.S. Appl. No. 12/143,174.

* cited by examiner

METHODS, SYSTEMS, AND ARTICLES OF MANUFACTURE FOR SYNCHRONIZING SOFTWARE VERIFICATION FLOWS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION(S)

The instant application is related to U.S. application Ser. No. 12/143,174, filed on Jun. 20, 2008, entitled "METHOD AND SYSTEM FOR TESTING AND ANALYZING USER INTERFACES" and U.S. application Ser. No. 12/796,361, now U.S. Pat. No. 8,799,867, filed concurrently, entitled "METHODS, SYSTEMS, AND ARTICLES OF MANUFACTURE FOR SYNCHRONIZING SOFTWARE VERIFICATION FLOWS", the contents of both applications are hereby incorporated by reference in their entirety.

BACKGROUND

Most computing devices, applications, and complex tools rely upon a user interface to interact with, receive input from, and provide information to users. There are many types of user interfaces. Common approaches to implement user interfaces include the graphical user interface (GUI), character user interface (CUI), and web-based user interfaces.

Like any other development process for a complex design, it is important to ensure that the process for developing a user interface involves adequate testing and verification of the performance and functionality of the interface components. In the field of computer science, GUI software testing is the process of testing a product that uses a Graphical User Interface (GUI), to make sure it meets its written specifications. This is normally done through the use of a variety of test cases, in addition to ad-hoc methods involving human interaction.

There are two conventional approaches which battle the synchronization issues. The first is a sleep statement approach which inserts a delay, by using a sleep statement, in the test case. The idea behind inserting the delay is to give the application some time to complete execution of the action it is performing. Abstractly speaking, the test is waiting for some time with the "hope" that some condition will be fulfilled by then. The other is a WaitFor statement approach. A WaitFor statement is also a form of a delay but it is not simply a time based delay but it waits for the state of the GUI to change. The tester or verification engineer may need to write some logic to identify the particular state that the test must wait for in order to fulfill the synchronization requirements of the component-operation.

In a typical GUI verification or testing, a tester or verification engineer often adopts the record-replay mechanism which records all the actions in the sequence that the tester performs and generates a script that may be subsequently replayed. Some record-replay tools employ the approach of automatically inserting sleep statements in the generated scripts to record the time-lag between two successive user operations. By using the sleep statements, the test tool is trying to encapsulate the state change of the GUI into a certain amount of time. The event recorder of the tool then inserts sleep statements into the script. These sleep statements make the script sleep for a specified amount of time.

The test tool then tries to ensure that the script is replayed in the same speed as it was recorded by the tester. So if the tester, while recording, waited for e.g. a window to pop up, the script will do the same. Nonetheless, this approach often tends to overkill the amount of sleep time in order to eliminate failures due to insufficient amount of waiting time. In other words, these tests tend to wait for longer periods of time than necessary. Moreover, this approach is often unstable because the specified amount of sleep time may be insufficient when slower testing systems are used for these tests. In addition, this approach may be unreliable by passing certain operations that should have failed or by failing certain operations that should have passed because there is no mechanism to check to see whether the previous operation has indeed completed.

The WaitFor approach instructs the test case to wait for a certain GUI component to change state or for some condition to be fulfilled rather than waiting for a certain period of time. In this approach, the tester is required to identify the component-operation that signifies the completion of the task and manually insert these WaitFor statements in the test case at the required locations. The test will then wait for whatever condition is provided with the statement to fulfill, before moving on to the next step in the test. These WaitFor statements could either wait for a specific GUI component to exist and be accessible or wait until a specific condition becomes true.

Nonetheless, the WaitFor statement in the above test case must be inserted manually as it requires identification of the state to wait for. In other words, the same WaitFor statement will need to be manually inserted in all places that require the test case to wait for the change of state or fulfillment of condition. This approach is thus impractical and prone to error due to the fact that there may be a large number of scenarios to be tested. This approach also requires the tester or the verification engineer to possess the knowledge of how and where to make the necessary changes. This approach also consumes a lot of computing resources because the same logic in the WaitFor statements will be duplicated many times in a test case. This approach also causes maintainability issues when there are changes in the logic for the WaitFor statements because such changes need to be replicated in all required places in a test case. In addition, this approach completely fails in cases of monkey testing or random scenario generation where the test tool is required to perform actions randomly because the randomly generated tests will not include such WaitFor statements.

SUMMARY

Disclosed are various embodiments of methods, systems, and articles of manufactures for synchronizing or testing software verification flows during testing of an application that uses a user interface (UI) or a graphical user interface (GUI). It shall be noted that the terms UI and GUI may be used interchangeably throughout this application to represent the user interface of an application under test (AUT) despite the differences between them. In other words, the use of UI in the instant application is intended to cover both user interfaces and graphical user interfaces. Likewise, the use of GUI in the instant application is intended to cover both user interfaces and graphical user interfaces.

In a single embodiment or in some embodiments, the method or the system comprises the acts or modules of identifying one or more generic application programming interfaces, applying a mapping process to the first application under test, and generating one or more generated application programming interfaces based at least in part upon the one or more generic application programming interfaces and a result of the act of applying the mapping process to the first application under test. Some embodiments of the methods further comprise the act of generating one or more custom application programming interfaces based at least in part upon at least one of the one or more generated application programming interfaces or implementing synchronization in at least one of the one or more generated application programming interfaces or the one or more custom application programming interfaces.

Some embodiments are directed at a hardware system which comprises at least one processor and is configured or programmed for performing various methods disclosed herein. Some other embodiments are directed at an article of manufacture that comprises a sequence of instructions which, when executed by at least one processor of a system, causes the system to perform various methods disclosed herein.

More details of the methods or systems for synchronizing a software verification flow of a first application under test will be described in subsequent paragraphs with references to various figures for explanation and illustration purposes.

BRIEF DESCRIPTION OF THE FIGURES

The drawings illustrate the design and utility of preferred embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
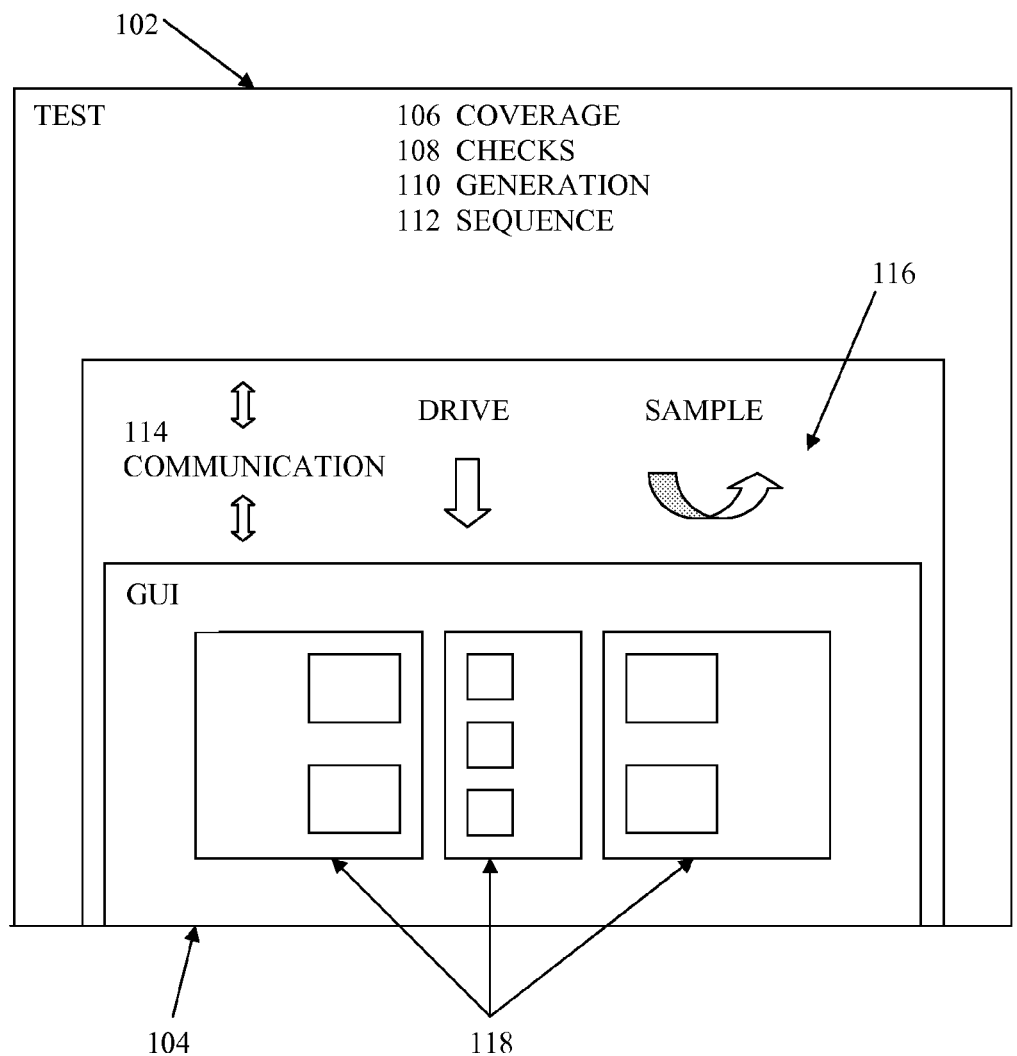
FIG. 1 illustrates a high-level diagram of the architecture for performing interface testing according to some embodiments.

Various embodiments of the invention are directed to a method, system, and computer program product for synchronizing software verification flows in the single embodiment or in some embodiments. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Various embodiments are directed to take on various challenges confronting the testing or verification of an application under test (AUT). Some of the challenges of an AUT that uses a GUI are synchronization or timing—whether or not the AUT is ready to receive a command from a test case. That is, the test case may have assumed that the application under test has completed the previous operation or task and is ready to receive the next operation or task while the AUT is busy and is thus not ready to receive such operations or tasks. These challenges are further exacerbated by the fact that no GUI application is designed to interact with a computer program and thereby lacks the ability to notify the computer program that is has completed execution of a certain operation or task and is ready to receive the next operation or task. In a case where such synchronization or timing issues occur, the test may fail because the AUT is busy with certain operations or tasks and is thus unable to respond to the next operation or task sent by the test case. Often, the operations or tasks that the AUT is busy with may be trivial—such as waiting for a window to pop up or enabling or disabling a button on the GUI. Of course, the operations or tasks that keep the AUT busy may also be some complex operations such as database transactions.

Note that these operations or tasks are executed on or in relation to a UI component such as a GUI menu item, these tasks and operations will be collectively referred to as a component operation or component-operation in this Application.

For example, suppose the test case has the following two commands in sequence: (1) click button; (2) read text from new window. The test case follows the sequence of commands and moves to step (2) almost instantly after step (1) has been executed on the AUT. It is important to note here that the test case assumes that (1) has completed execution and the application under test is ready to receive the next command. This, almost always, will not be the case because the new window may take some time to load before which the application may not receive any further commands. Thus, the test fails when the test case sends command (2) to the AUT while the AUT is still, for example, waiting for (1) to complete execution.

The synchronization or timing (hereinafter synchronization) issues may also give rise to other issues which are also resolved by various embodiments. For example, with continuous modifications and advancement in the application, it is quite possible that some tests which were running smoothly in one version break in another version due to the differences in timing of certain events that the test case is trying to verify. For instance, a window that was loading static data earlier now retrieves data from a database and thus may take a longer time to achieve the same purpose. While the test is trying to verify the same functionality (of reading the data on the window, for example), the test may fail due to the difference in the time required for fetching the data from the database server.

Another class of issues addressed and resolved by various embodiments is one that may also arise due to synchronization issues is related to reliability. Certain tests may be largely dependent on the performance or workload of the system which the tests perform on (such as a GUI verification system) or require for the completion of the test (such as a database server that some test cases may require for the completion of the test cases). Thus, there is high probability that these tests may fail if these tests are subsequently replayed on a slower machine or even on the same machine but with higher workload due to the execution of other processes or performance of other tasks.

In addition, the third class of issues addressed and resolved by various embodiments is one that may arise out of the synchronization issues is incompleteness. There exist some scenarios which may be left out because a test case cannot cater to the synchronization issues.

FIG. 1 shows a high level architectural view of some embodiments of the invention that include a testbench 102 and an application under test (AUT) 104. The AUT 104 comprises a GUI/CUI having numerous GUI/GUI elements 118 (hereinafter user interface or UI). The coding of the testbench 102 is used to drive and stimulate the GUI elements 118 within the AUT 104. As the testbench 102 is executed, it communicates with the GUI for the Application Under Test 104 via a communications channel 114. Data sampling is performed to collect the data 116 representing results of stimulating the AUT 104 with the testbench 102.

According to some embodiments, an electronic design verification environment may be used to implement the architecture of FIG. 1. A Hardware Verification Language (HVL) is modified and extended such that, instead of interfacing with simulation of a hardware device modeled in a language such as Verilog or VHDL, it instead interfaces with the Graphical/Character User Interface (GUI/CUI) 118 of the target AUT 104. The testbench 102 in the verification language then drives the AUT 104 by generating and providing a GUI/CUI stimulus which emulates user behavior or external behavior, by collecting AUT status and optionally GUI status, and by comparing the identified status against an expected status. In one embodiment, the testbench 102 may be implemented using the "e" language, specifications. A suitable verification environment may be provided by, for example, the Specman tool. Other verification languages and environments may also be used in conjunction with, and within the spirit of, the invention.

The advantage of using a HVL is that the process of performing UI testing implicates many similar problems that have been faced in the past by ASIC designers, who were forced to use Hardware Description Languages (HDL's) such as Verilog and VHDL to test their hardware designs. The verification engineers found the levels of abstraction allowed for by these languages to be insufficient, which forced the evolution of a new class of languages dedicated to verification of hardware designs. The resulting HVLs, e.g., the "e" language, introduced higher order constructs for dealing specifically with verification problems.

In similar spirit, the invention described herein addresses the issue of software application and UI testing at a much higher level of abstraction than allowed for by the commonly employed tools. Language features of HVL's are employed, along with appropriate improvements and extensions to render said HVL's and their associated regression management and analysis environments applicable to UI testing. Use of a HVL-like approach to UI testing as described herein will allow the UI verification engineer to use a language, which is designed for complex state and sequence testing, for the authoring of UI test cases, including their abilities to write constraint-based randomized tests in addition to directed tests.

Various embodiments as described herein may be employed in conjunction with regression management and test plan authoring tools to allow UI verification personnel to define exactly what they want to verify, to write and formally capture a verification plan, and formally define the required coverage points. The vManager product, which is well known in the field, is an exemplary tool that may be used in conjunction with the invention used to perform regression management in a UI-testing environment and to allow engineers to create a testbench 102.

Using a test plan regression manager also allows the software verification or quality assurance engineer to set up a targeted regression involving multiple tests, to run regressions using the same tests with multiple seeds (which control the random number generation process), to analyze the regression results in terms of passed/failed checks, to automatically re-run failed checks while preserving the random seed as necessary, and finally to explicitly analyze and identify those areas of high UI state coverage and low or missing coverage. The tracked testing metrics provide feedback for the UI designers and product managers for the aim of robust product test and development.

As noted above, the testbench 102 communicates with the UI elements 118 in the AUT 104 using a communications channel 114. In some embodiments, the communications channel 114 is implemented via a socket connection, making it possible for the testbench execution and the AUT execution to be in separate operating system processes, or even on separate machines. Other forms of inter-process communication may also be used instead. In yet another embodiment, the testbench 102 and AUT components 118 may be combined within a single operating system (OS) process. The communications channel 114 provides a non-transitory medium that facilitates the testbench 102 driving the AUT 104, and that allows the AUT 104 to respond to those events, in addition to providing query application programming interfaces (APIs) through which the testbench 102 can obtain UI object values (such as, for example, button state, values of text strings within a type in field) from the AUT 104.

The testbench 102 is configured to provide an improved approach to address test coverage 106. It is generally very difficult to know with any level of confidence or accuracy just how representative a set of UI tests are in terms of covering all of the possible states of a UI. With increasing functionality being provided in successive software releases, the number of valid UI states that can be arrived at for any given software application is exponentially increasing over time. To ensure a representative set of tests are used to achieve a decent level of state coverage, some embodiments of the invention provide the ability to measure or otherwise quantify the degree of UI state coverage provided by a testbench 102.

The testbench 102 can also be used to configure the checks 108 that are used to query and verify the operation and functionality of the UI 104 and its components 118. Examples of such checks 108 are described in more detail below.

One benefit of using a verification language (such as the "e" language) to author the testbench 102 includes the ability to generate 110 constrained (e.g., legal) random values and sequences of values. This effectively allows a test to be authored as a template, during the execution of which the template is realized into a sequence of concrete tests via a randomization process. A single test template may thus be used to generate a multitude of actual tests and scenarios during the run time of the tests, and exercise multiple "flavors" of the specified scenario.

Another benefit of the present approach is that sequencing 112 can be addressed using the testbench 102. This is extremely useful since some functionality of the AUT 104 may only be accomplishable by following a complex sequence of UI events. For example, to open a file a user may have to engage in a long sequence of operations that include clicking on the "File" menu, selecting the "Open" operation, using a dialog box to specify the file name, and then focusing the application on the newly opened window. This type of sequence can be specified in testbench 102.

These new schemes lead to tremendous increases in software application testing productivity, especially in the based applications, and present a vast reduction in the overhead required for release-to-release testcase maintenance. Though the examples described herein are with respect to UI's and UI verification, the reader will understand that these are intended to be exemplary only, and that the spirit of the invention as a whole is not limited to just that of UI verification and validation. Other complex state-based systems can equally be verified by a similar approach, with application-specific components being used to substitute the UI-specific components described herein during the augmentation or extension of existing or yet-to-be-determined Hardware Verification Languages.

Figure 2:
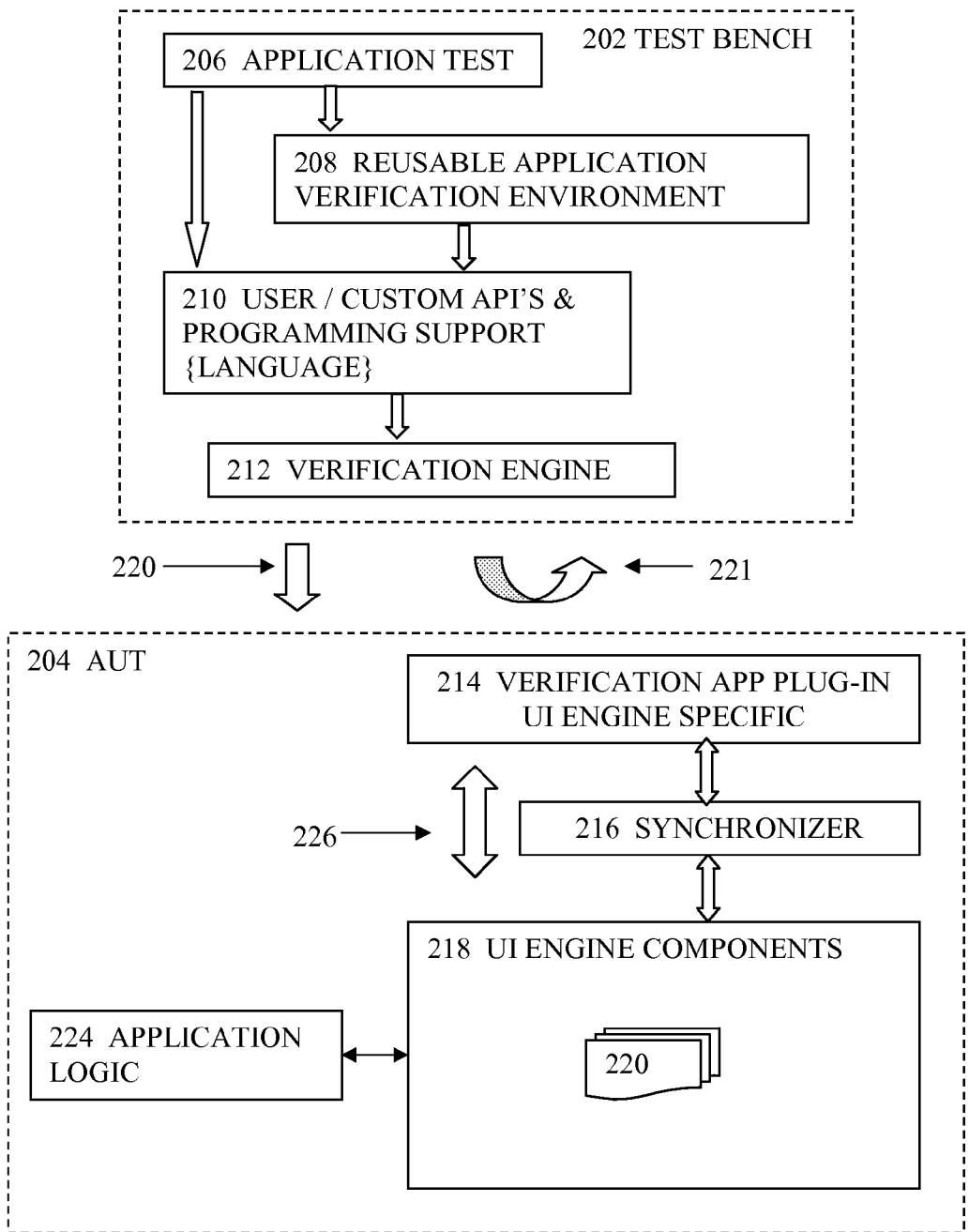
FIG. 2 illustrates a more-detailed diagram of the architecture for performing interface testing according to some embodiments.

FIG. 2 shows a more detailed diagram of an embodiment of the architecture for implementing some embodiments of the invention. The illustrated architecture includes two major components, the Testbench or "server" side 202 which generates the AUT drive/command (220) and sample/query (221) messages, and the AUT or "client" side 204 which receives and responds in kind to those messages. As used herein, the testbench side 202 may also be referred to as the "GTX" side or component.

The testbench "server" side 202 extends the standard HVL environment in two major areas. First, an API 210 is provided for driving (220) the UI of the AUT, and for sampling (221) the state of that UI. This API 210 may be implemented, for example, using the "e" programming language structs (classes) and methods. Second, a communications channel is provided that connects to the AUT. The server side API 210 is responsible for communication of the UI commands to the AUT client, and for making the results of UI queries available to the application test 206.

In addition to the "e" programming Language and GTX User/Custom API for UI Command/Query, UI verification engineers can define additional UI Verification IP in the form of, for example, a custom library or libraries, in user/custom API's and Programming Support 210, and specify coverage requirements, checks that are to be performed, sequences that are to be generated, or other testing attributes. In one embodiment, these components can be defined using the extended "e" programming Language.

The application test 206 is authored in the extended "e" programming language, and may either be written directly using the language extensions described via examples herein, or by instantiating/calling UI Verification IP stored in customer libraries, as described above, or both. The application test 206 may be configured to include calls to the API 210.

The combined form of the application test 206 and library extensions 208 may be processed by the verification engine 212 and used to send drive messages (220) to stimulate the UI application. The verification engine also sends query messages (221) to the UI application to gather information about the state of the UI.

On the application "client" side 204, a UI application is extended via incorporation of a Plug-in 214 such as a GTX Plug-In. The plug-in is a UI toolkit specific implementation which translates the UI drive commands (220) and query messages (221) from the testbench server 202 into actual calls (226) to the underlying UI toolkit. Each underlying type of application would correspond to a plug-in 214 that is configured to interface to the correct respective language. For example, plug-ins may be configured to translate the drive commands and query messages into Java, Qt, Tcl/Tk, or any other suitable interface format.

The plug-in would present the test messages into UI engine-specific method calls, such as button.click( ), text.get( ), and similar calls. Plug-ins 214 can be authored for any such GUI implementation/language. The plug-in 214 may comprise custom or standard plug-ins as provided by various verification tools. The plug-in 214 also implements the client side of the communications protocol, communicating the results of GUI Drive and Query commands back to the testbench "server" side 202. The UI Engine Components 218, which comprises various component names 220 for the respective components, interfaces with the application logic 224. One or more synchronizers 216 ensure that the application under test (AUT) is ready to receive various operations, commands, or tasks from the test bench and is registered with the UI engine components 218. Note that in some embodiments, the application under test may be run on a single computing node. In these embodiments, the single computing node comprises all the components of both the test bench 202 and the application under test 204.

Figure 3:
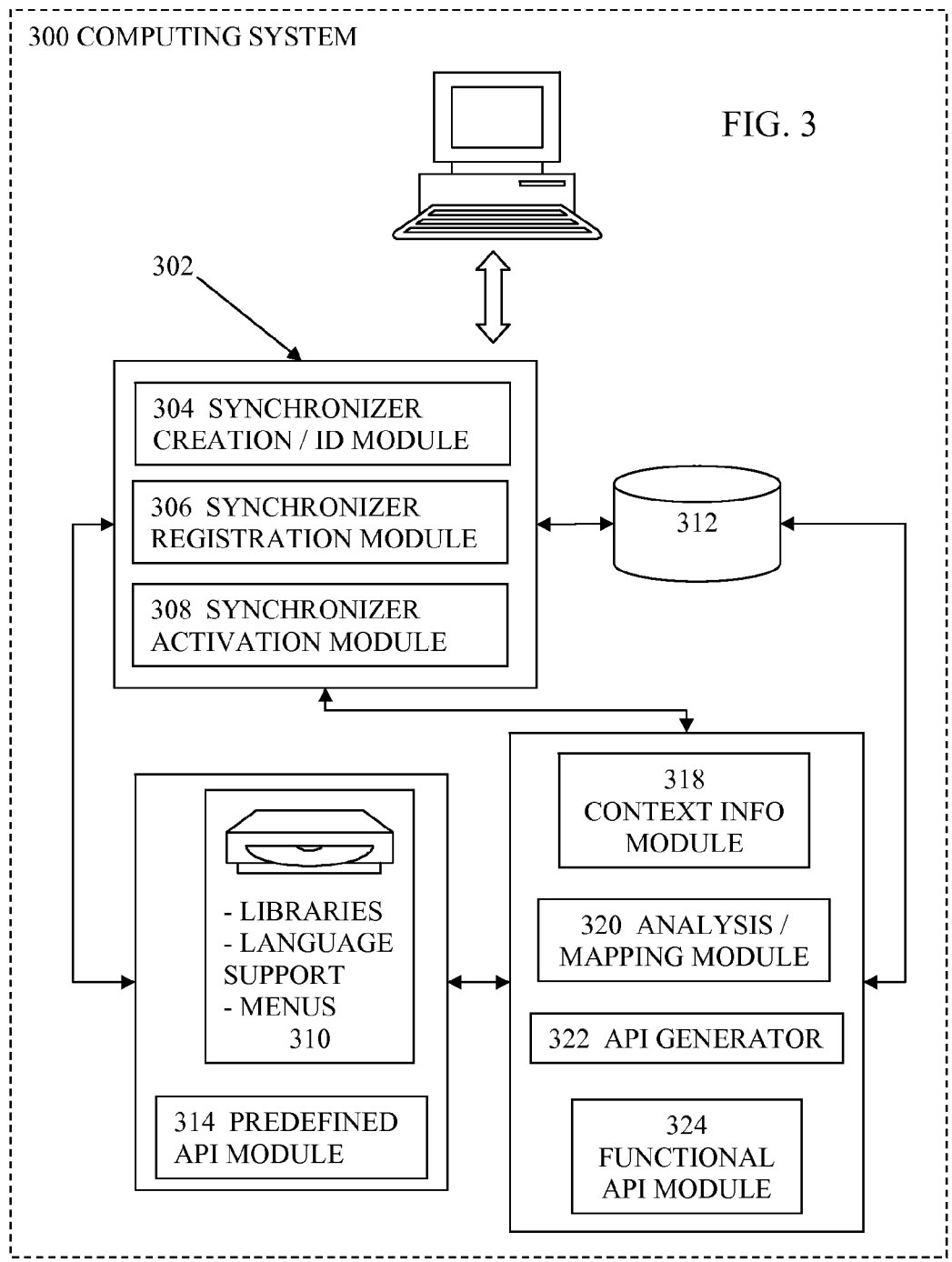
FIG. 3 illustrates a more detailed diagram of the architecture for performing tasks or operations on the application under test of FIG. 2.

FIG. 3 illustrates a more detailed diagram of the architecture for performing tasks or operations on the application under test of FIG. 2. The AUT computing system comprises a computer system which invokes or interacts with the first module 310 which may be part of the computing system 300 or may be remote to the computing system 300. The first module 310 comprises the libraries such as the programming language standard libraries. The first module 310 also provides programming language support for the testers or the synchronizer, API, or logic developers. In other words, the first module 310 provides support for the testers to write test cases or test flows or for the synchronizer, API, or logic developers to develop the needed synchronizers (which will be described in full details in subsequent paragraphs), API's, or various logic such as the wait logic.

The AUT computing system may further comprise or invoke the pre-defined API module 314, which may be part of or may be remote to the computing system 300. The pre-defined API module comprises an API repository which comprises a set of pre-defined API's (application programming interfaces) that are pre-defined by the GUI testing platform such as a GTX testing platform. These pre-defined API's may be integrated in various libraries of the testing platform or may be stored separately in a repository such as a non-transitory computer readable storage medium or a directory therein in the single embodiment or in some embodiments.

The computing system also invokes, executes, or interacts with the synchronizer module 302 which comprises the synchronizer creation or identification module 304, the synchronizer registration module 306, and the synchronizer activation module 308. The functions of the synchronizer module 302 will be described in full details in subsequent paragraphs with reference to various figures of this Application. The synchronizer module 302 interfaces or interacts with a storage system 312 which may be part of or may be remote to the AUT computing system 300. The storage system 312 stores thereupon data and information such as reusable synchronizers and others that may help the testers or the synchronizer, logic, or API to develop the necessary codes. The storage system 312 may be configured in the form of one or more permanent storage systems such a hard disk or some non-volatile media or one or more temporary storage systems such as certain volatile media.

In the single embodiment or in some embodiments, the computing system also interacts with and/or invokes various other modules such as the context information module 318, which may comprise context information, such as but not limited to, functionality of one or more applications under test (AUTs) or systems under test (SUTs) (hereinafter application under test, AUT) that is to be tested, simulated skill or experience level of the users in the test cases, etc. The context information module 318 may be used to provide such context information that is related to various tests of one or more AUTs to various other modules such as the synchronizer module 302, the API generator 322, and the function API module 324 in the single embodiment or in some embodiments.

In the single embodiment or in some embodiments, the computing system also interacts with or invokes various other modules such as the analysis/mapping module 320, which analyzes an AUT and maps various items (for example, the main window of the AUT, various menu items, various buttons, etc.) of the AUT to respective, unique logical names. The computing system also interacts with or invokes the API generator 322, which generates generated application programming interfaces (generated APIs) by using at least the result of the analysis/mapping module 320 in the single embodiment or in some embodiments. In some embodiments, the API generator 322 generates those generated APIs by further using one or more pre-defined APIs from 314. More details about the generated APIs and the predefined APIs will be further described with reference to the drawing figures in subsequent paragraphs.

In the single embodiment or in some embodiments, the computing system also interacts with or invokes the functional API module 324, which creates custom APIs. More details about the custom APIs will be further described with reference to the drawing figures in subsequent paragraphs. It shall be noted that the various modules in FIG. 3 work with each other to provide the user an automated process for testing a user interface of an AUT with automated synchronization within one or more sequences of operations, while the user need not worry about synchronization or wait states within the one or more sequences of operations for testing the UI of the AUT. In other words, the user may ensure that the UI testing of the AUT proceeds with proper synchronization between two consecutive operations without unnecessary or insufficient wait between the two consecutive operations such that the subsequent operation starts as soon as the preceding operation has completed and need not manually insert any wait states of fixed or variable periods of time into the one or more sequences of operations. It shall also be noted that the first module 310 and the pre-defined API module 314 also read from or write to the storage system 312 even though FIG. 3 does not show a bi-directional arrow between them. In some embodiments, the first module 310 and the pre-defined API module 314 may be implemented within the storage system 312.

It shall be further noted that each individual module as described herein may be implemented in the form of pure software, pure hardware such as electronic circuitry, or a combination thereof. Also note that, as described in the previous paragraphs with reference to FIG. 2, the verification flow may be performed on a single computing node instead of in a multiple computing nodes configuration in some embodiments. In these embodiments, the AUT computing system further comprises the components, modules, and elements of the test bench 202.

Figure 4:
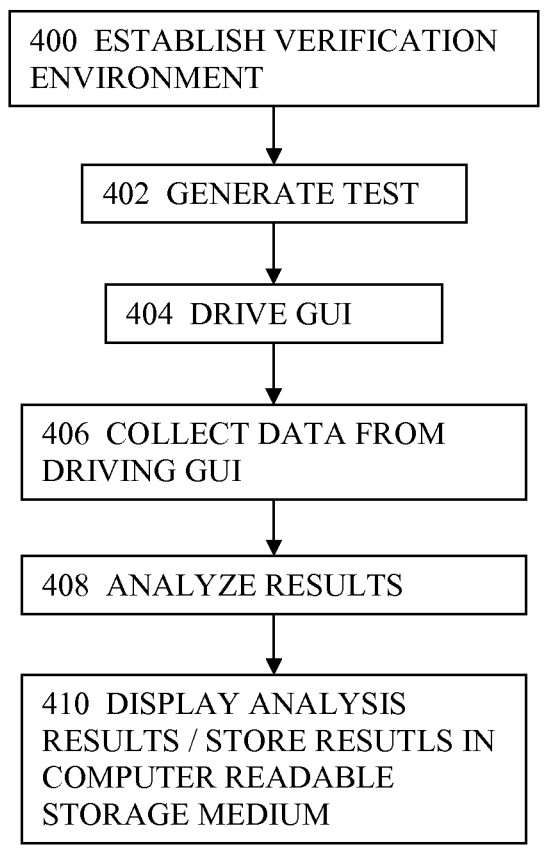
FIG. 4 illustrates a flowchart of a process for testing an interface according to some embodiments.

FIG. 4 illustrates a flowchart of a process for utilizing the architecture of FIG. 2. The process begins at 400 by establishing a verification environment (VE) for each application under test. This VE (which can be placed in a UI verification IP library), includes a set of "e" language files which define classes and behavior that are shared by all of the tests of the specific application. This methodology allows for a significant degree of code reuse. A VE may include, for example, at least 3 types of classes, and potentially many more. A number of application and functionality-specific tests are then authored in extended HVL language. These testbenches import or reference the AUT-specific VE defined in the verification IP libraries, in addition to more generically written non-AUT-specific verification IP that can verify more basic test level functionality. This more basic verification IP may also be placed in a verification IP library.

One example type of Verification Environment class or code behavior is a specific application launcher class. This class or code would allow the testbench author to launch the application using various methods, including a simple launch or a launch-with-command-line-arguments, and could easily be extended to handle additional launch requirements.

A second example type of class or code behavior is the specific application class. The application class inherits from the base application class and its methods relate to application specific logic, providing application window creation (constructor), initialization and query methods, in addition to other classes representative of the application's primary design architecture and logic. Further, in the case where the AUT supports a GUI in parallel to the GUI, the application class supports the required API.

A third example type of class comprises the various specific window classes, such as a main window class, any sub-window classes, etc, and reflects the various types of windows and sub-windows in the application, and their relationships. These classes further contain references to window-specific logic, including the various sub-widgets (such as trees, toolbars, buttons, etc.) comprising the window or sub-window.

The intent of these methods according to one embodiment is to create HVL language handles to AUT main window widgets only once. This reference is then returned anonymously, and it is that class method which is used in all tests that need to reference and manipulate objects such as windows, primary widgets, tree structures, etc. in the AUT application. Should that those objects get renamed or re-parented, the tests calling the method of the AUT main window application class will be unaffected. This is one of the advantages of the present invention, in which it provides a system in which specific application tests are insulated form various changes in the UI itself as the software evolves across releases.

At 402, the application test is created. The application test comprises a set of statements to test the UI written in a suitable verification language, such as the "e" language. API calls are embedded into the application test to drive the actions that are needed to test the UI. The embedded calls also provide the basis for generating query calls to check the state of the UI at various points in time and to obtain information about the UI. The application test may also incorporate or call other test components that may be stored in one or more libraries. Any UI element and component can be stimulated using the application test. The following are some example UI elements that can be tested in certain embodiments:

WINDOW,
BUTTON,
ACTION,
CHECKBOX,
RADIOBUTTON,
COMBOBOX,
LISTBOX,
TEXTBOX,
TEXTAREA,
LABEL,
TABCONTROL,
TABLE,
TABLE_ROW,
TOOLBAR_BUTTON,
MENU,
MENU_ITEM,
TREE,
TREE_ROW,
WINDOW
CANVAS,
SCROLLBAR,
IMAGE,
PANEL.
SPLIT_PANEL

The API would include a method/interface to address each of the supported UI elements. These methods would include mechanisms to initialize, drive, manipulate, operate, and/or to query these elements.

At 404, the application test is processed by the verification engine to drive the UI being tested. In operation, the verification engine parses through the application test to identify the test instructions. The test instructions are communicated over a communications channel to the plug-in that is incorporated with the application under test. The plug-in translates the test instructions into the appropriate format suitable to the UI application. The translated test instructions are then applied to the UI to perform the specified test operations, which are essentially a set of operations that performs actions and functions within the UI.

Data collection instructions are processed at 406. This occurs by having the verification engine parse the application test to identify the specific types of information that are being sought by or for the test. A set of query commands would then be sent from the verification engine at the test side to the plug-in at the application side. The query commands would be processed by the plug-in to capture the requested information from the UI or to capture the state of some or all of the UI.

The collected data from the UI is then returned for analysis at 408. Analysis may be performed to determine whether the UI has properly performed the operations being tested by the application test. One approach to implement this action is to maintain a set of expected UI results for each test that is checked against the actual results of applying the test to the UI. Each test can receive a "pass" or "fail" indication depending upon whether the collected test results sufficiently match the expected results.

At 410, the method or the system displays the analysis results on a display apparatus such as a monitor or stores the analysis results in a non-transitory computer readable storage medium in some embodiments. A regression test manager product can also be used to facilitate display and analysis of the test results.

Figure 6:
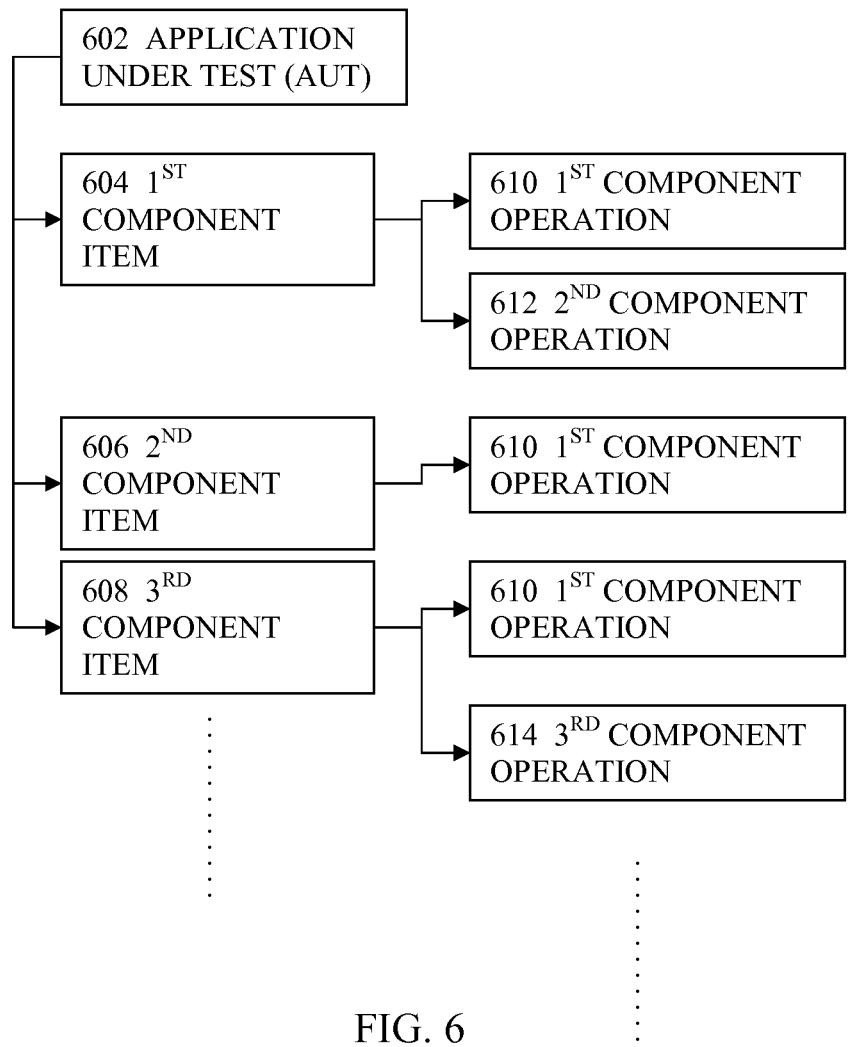
FIG. 6 illustrates an exemplary application under test with multiple component items and their respective component operations.

With reference to FIG. 6 which illustrates an exemplary application under test with multiple component items and their respective component operations, the application under test (AUT) comprises a plurality of component items such as component item 1, component item 2, component item 3, etc. Each of these components is associated with one or more component operations. An example of the component items comprises a dialog box asking to confirm a certain operation such as a dialog window with a "yes" button, a "no" button", and a "cancel" button. Another example of the component item is a menu item such as "File", "Edit", "View", "Help", etc. At least one of the component items comprises one or more sub-component item or sub-menu item such as "File—Open", "File—Save", etc., where the "Open" and "Save" items represent the sub-component items of the component items "File".

An operation or task involved with the UI testing that is usually executed on or in relation to a component item of the UI is thus collectively referred to as a component item. An example of the component operation is a click on the component item such as clicking on a particular menu item in the UI or on a particular button such as a "yes" button in a dialog window. Furthermore, a particular component operation may be associated with more than one component item. For example, the same type of clicking operation may be associated with multiple component items, sub-component items, menu-items, or sub-menu items (collectively menu items).

This is illustrated in FIG. 6 which shows that the application under test comprises the first menu item (604) which is associated with the first (610) and the second (612) component operation, the second menu item (606) which is associated with the first component operation (610), the third component item 608 which is associated with the first (610) and the third (614) component operations, etc. FIG. 6 shows only three component items with a total of five component operations. Nonetheless, an application under test may comprise many component operations to be tested during the UI testing. For example, a simple word processing application may have much more menu items and hundreds or more component operations to be tested or verified during the UI testing.

Figure 5:
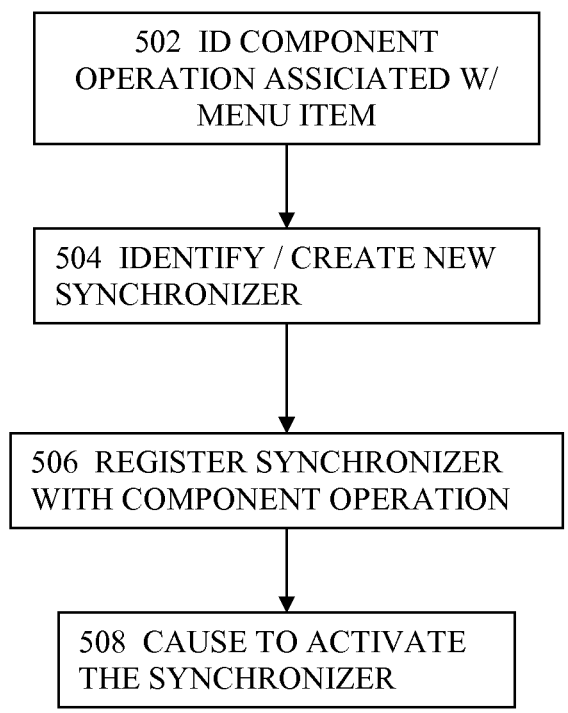
FIG. 5 illustrates a high level diagram for the process or hardware module for testing an application which uses a user interface.

With reference to FIG. 5 which illustrates a high level diagram for the process or hardware module for testing an application which uses a user interface, the method or the system for testing a user interface comprises the act or module of identifying a component operation which is associated with a menu item of the user interface at 502 in some embodiments.

The method or the system further comprises the act or module of identifying or creating a new synchronizer at 504. In some embodiments, the synchronizer resolves the synchronization or timing (collectively synchronization hereinafter) related issues between the application under test and the test tool such as the test bench 202.

In some embodiments, the synchronizer is developed or defined by a super user who possesses the knowledge of developing the logic, tasks, operations, or commands involved in the synchronizer and also the knowledge of the operations, interactions, and communications between applications under test and the test tools such as the test bench 202. In these embodiments, a general tester, a verification engineer, or a test flow writer (collectively tester) who is responsible for carrying out the UI testing need not possess such knowledge as the super user does. The tester or the verification engineer need not even be aware of contents of the synchronizer at all. In other words, various embodiments introduce a non-intrusive approach for testers who no longer need to deal with manually inserting the logic or some statements into the test flow. In some embodiments, the tester or the verification engineer may also develop or define such synchronizers for any component operations.

In various embodiments, the synchronizer needs to be defined only once and may be stored in a central repository such as a non-transitory computer readable medium that is accessible by a plurality of testers and synchronizer developers so the synchronizers may be modified, shared, or reused. One of the advantages according to some embodiments is that the test case or the test flow itself needs not relate to synchronization or timing in any manner. In other words, no WaitFor statements, sleep statements, or any other synchronization related statements or commands need to be inserted into the test flow or the test case, and the tester needs only to focus on the flow of the test.

Another advantage according to some embodiments is that random testing of the user interface will also be synchronized because of the absence of the synchronization statements, logic, or commands from the test case or test flow. Yet another advantage according to some embodiments is regarding the reuse of the synchronizers. For example, there are 1000 tests for an application under test. There could be 20 specific component-operations that need synchronization and suppose 500 tests (out of the 1000) are exercising one or more of these 20 component-operations. In this case, there only need to be 20 synchronizers (one per component-operation), irrespective of the number of tests. The number of tests could increase but the synchronizers will not be re-written for a component-operation. If the tests are to be carried out without the use of Synchronizers, the synchronization logic will have to be replicated 500 times. As the tests increase, this effort of replicating the logic also increases.

Figure 7:
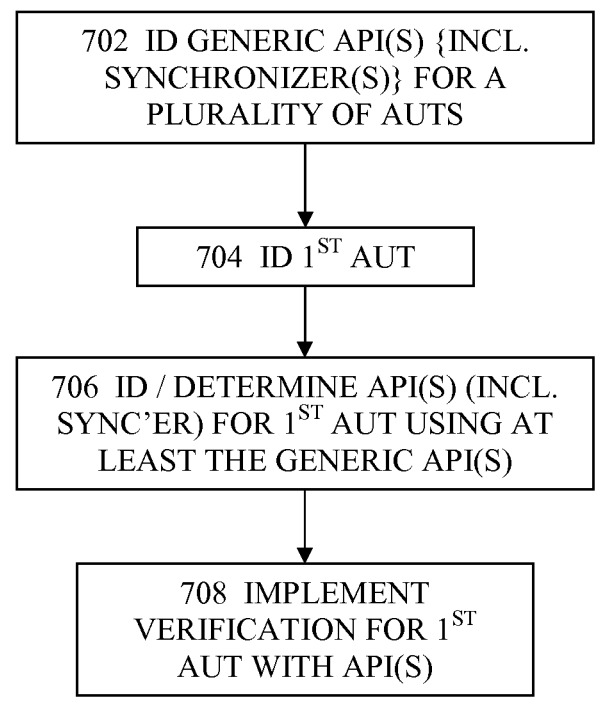
FIG. 7 illustrates an exemplary high level diagram for the process or hardware module for implementing an AUT testing or verification with automated synchronization.

FIG. 7 illustrates an exemplary high level diagram for the process or hardware module for implementing an AUT testing or verification with automated synchronization. In a single embodiment or in some embodiments, the process or hardware module for implementing an AUT testing with automated synchronization comprises identifying or determining one or more generic APIs or pre-defined APIs for a plurality of AUTs at 702. It shall be noted that the terms generic API and pre-defined API are used interchangeably throughout this application, and both are used to denote an application programming interface that is developed by the developer of the testing framework and thus constitutes a part of the testing framework that is provided to users of the testing framework. In some embodiments, the pre-defined APIs are generically and commonly defined so as to apply to all or at least a plurality of different AUTs. For example, the do_click( ) method in some examples described below is an exemplary pre-defined API that may be applied to every button component that may be clicked upon.

In the single embodiment or in some embodiments, the process or hardware module for implementing an AUT testing with automated synchronization further comprises identifying a first application under test (AUT) at 704. The first AUT represents the application or system whose user interface (UI) is to be tested. At 706, the process or hardware module for implementing an AUT testing with automated synchronization further comprises identifying or determining one or more APIs for the first AUT, which is identified at 704, by using at least one or more pre-defined APIs that are identified at 702 in the single embodiment or in some embodiments. In the single embodiment or in some embodiments, the process or hardware module for implementing an AUT testing with automated synchronization may further use information specific to the first AUT in identifying or determining the APIs for the first AUT at 706. In the single embodiment or in some embodiments, the process or hardware module for implementing an AUT testing with automated synchronization further comprises implementing the synchronization in the one or more APIs at 706. More details about the actions at 706 will be described in subsequent paragraphs.

At 708, the process or hardware module for implementing an AUT testing with automated synchronization may further comprise implementing the verification for the first AUT by using the one or more APIs that are identified or determined at 706 in the single embodiment or in some embodiments.

Figure 8:
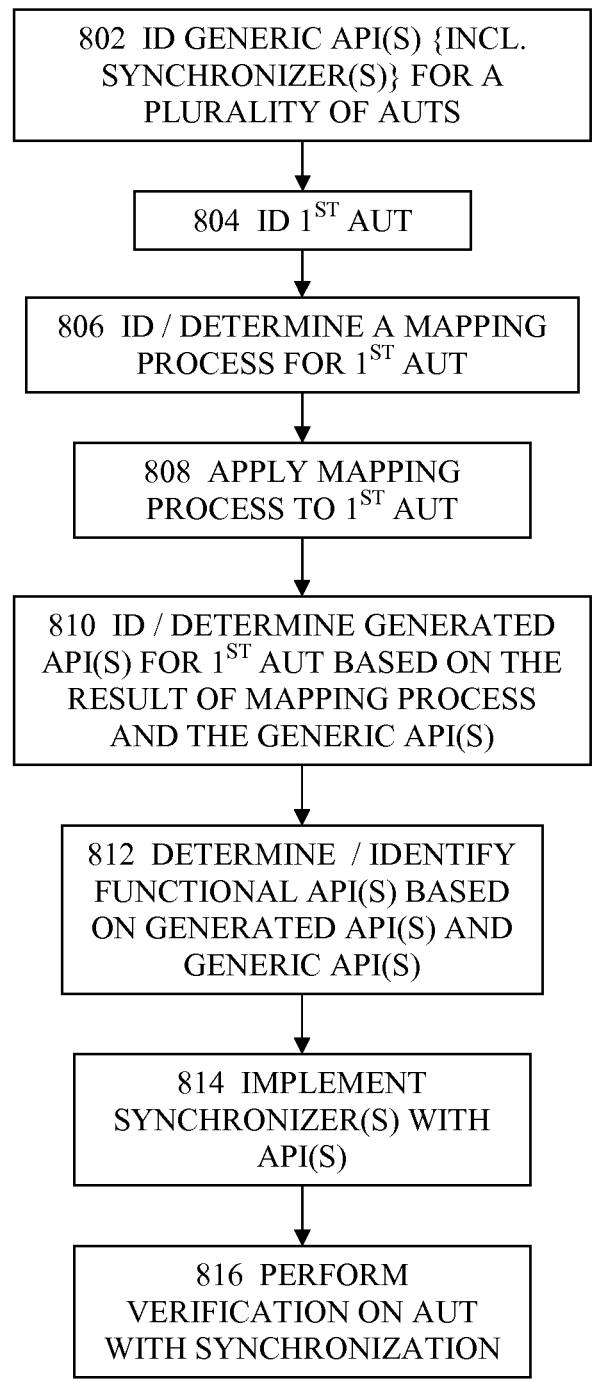
FIG. 8 illustrates more details for the process or hardware module for implementing an AUT testing or verification with automated synchronization.

FIG. 8 illustrates more details of the process or hardware module for implementing an AUT testing or verification with automated synchronization. At 802, the process or hardware module for implementing an AUT testing or verification with automated synchronization comprises identifying one or more generic APIs in a single embodiment or in some embodiments. At 804, the process or hardware module for implementing an AUT testing or verification with automated synchronization further comprises identifying a first AUT whose user interface (UI) is to be tested or verified.

At 806, the process or hardware module for implementing an AUT testing or verification with automated synchronization comprises identifying or determining a mapping process for the first AUT in the single embodiment or in some embodiments. In these embodiments, the mapping process maps the first AUT and each of a plurality of components of the first AUT to a corresponding logical name. For example, the mapping process may map the first AUT to the logical name "mac_app" and the main window of the first AUT to "mac_main_window" in the examples provided in the following paragraphs.

At 808, the process or hardware module for implementing an AUT testing or verification with automated synchronization comprises applying the first mapping process to the first AUT in the single embodiment or in some embodiments. In some embodiments, the process or hardware module for implementing an AUT testing or verification with automated synchronization may further comprise analyzing the first AUT to identify the components, such as menu items, etc., of the first AUT that need to be referenced in the verification or testing of the AUT. In these embodiments, the process or the hardware module maps the first AUT and a plurality of components of the first AUT to their respective logical names.

At 810, the process or hardware module for implementing an AUT testing or verification with automated synchronization comprises identifying or determining one or more generated APIs for the verification or testing of the first AUT based at least in part on the result of the application of the mapping process and/or one or more generic APIs in the single embodiment or in some embodiments. In some embodiments, the process or hardware module for implementing an AUT testing or verification with automated synchronization automatically generates the one or more generated APIs by using the logical names defined during the mapping process and one or more generic APIs that are needed or desired in the generated APIs.

The following exemplary code represents the automatic generation of the generated APIs by using the result of the mapping process and one or more generic APIs.

```
extend sys {
run( ) is also {
    var mac: mac_app=launch_mac_app( );
    var main_window: mac_main_window=
  mac.get_mac_main_window( );
    main_window.get_load_run_menu_item( ).do_click( );
    var file_dialog: mac_file_dialog=mac.get_file_dialog( );
    file_dialog.get_file_listbox( ).do_click_row(0);
    file_dialog.get_ok_button( ).do_click( );
    main_window.get_modules_frame( ).do_click( );
    main_window.get_attributes_frame( ).do_click( );
    main_window.get_quit_menu_item( ).do_click( );
};
};
```

In the above exemplary code for the generated APIs using the mapping process and one or more generic APIs, the do_click( ) constitutes a generic API that is developed by the developer of the UI testing system or is contained as part of the UI testing system. The function of the do_click( ) comprises simulating the invocation or activation of clicking on a designated menu item such as a button or an item in a window.

In the above exemplary code for the generated APIs using the mapping process and one or more generic APIs, the mac_app=launch_mac_app( ), mac_main_window=get_mac_main_window( ), get_load_run_menu_item( ), mac_file_dialog, get_file_dialog( ), get_file_listbox( ), get_ok_button( ), get_modules_frame( ), get_attributes_frame( ), and get_quit_menu_item( ) constitute the generated APIs that are automatically generated by using the mapping process and the generic APIs.

More specifically, the launch_mac_app( ) constitutes the generated API to launch the AUT which is defined to be "mac"; the mac_main_window=get_mac_main_window( ) constitutes the generated API to simulate the displaying of the main display window including the UI for the AUT mac; the get_load_run_menu_item( ) constitutes the automatically generated API for simulating the invocation or activation of some menu items of the AUT; the mac_file_dialog constitutes the automatically generated API for simulating the invocation or activation of the file menu item in response to which the processes or hardware modules expect, for example, a plurality of sub-menu items such as "open", "save", etc. would be made available for subsequent activation or execution; the get_file_dialog( ) constitutes the automatically generated API for simulating the invocation or activation of a diaglog box showing a list of files available for opening; the get_ok_button( ) constitutes the automatically generated API for simulating the invocation or activation of an "OK" button after a file is selected for opening; the get_modules_frame( ) and the get_attributes_frame( ) constitute the automatically generated APIs for simulating the invocation or activation of an "modules" tab in the main window and an "attributes" tab under the "modules" tab in the main window for simulating the invocation or activation of the "modules" tab and then the "attributes" menu. These generated APIs are automatically generated by using any suitable programming language with standard structs, variables, methods, or libraries, etc. for UI testing. Such programming language, standard structs, variables, methods, libraries, etc. for UI testing are considered within the basic understanding of one of ordinary skill in the art.

Figure 9:
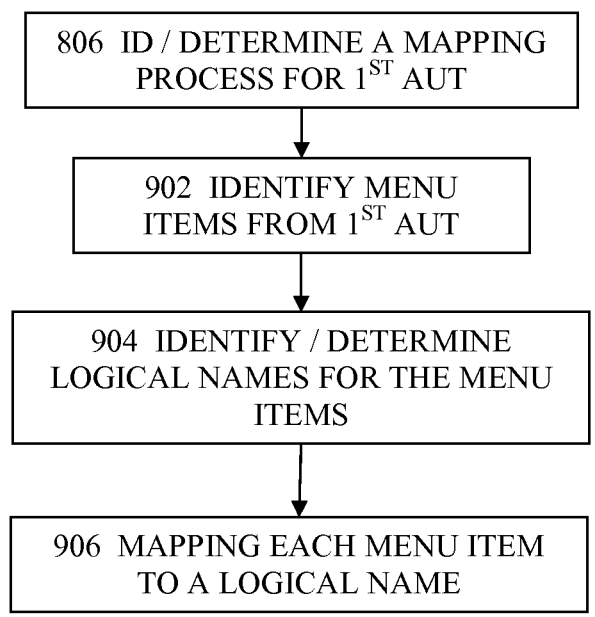
FIG. 9 illustrates an exemplary high level block diagram for the process or hardware for identifying or determining a mapping process for an AUT.

FIG. 9 illustrates an exemplary high level block diagram for the process or hardware for identifying or determining a mapping process for an AUT for the process or hardware module 806. At 902, the process or hardware module for implementing an AUT testing or verification with automated synchronization comprises a process or module of identifying one or more menu items form the first AUT in a single embodiment or in some embodiments. In one or more embodiments, the process or module may identify all the menu items of the first AUT for a complete test. In some embodiments, the process or module may identify some of the total menu items that are of interest for the AUT testing or verification. For example, the process or module or a user may identify all sub-items for the file menu item if the testing or verification is intended or designed to test the file menu item of the first AUT.

At 904, the process or hardware module for implementing an AUT testing or verification with automated synchronization comprises a process or module for identifying or determining one or more corresponding logical names for the menu items or sub-items that have been identified at 902 in the single embodiment or in some embodiments. For example, the process or the hardware module may identify or determine the logical name for the sub-menu item "File-Open" to be "mac_file_open". In these embodiments, the process or module 904 identifies the corresponding logical names for the menu items and sub-items by, for example, looking up some names from a data structure and append such names to certain other parts to ensure that such logical names distinguish from each other for the testing or verification of the first AUT.

For example, the process or module may look up a part of the logical name "open" for the sub-menu item "File-Open" and append the part to "mac_file" to distinguish from another sub-menu item "Tools-Open Plugin". That is, in the aforementioned example, the corresponding logical name for the sub-menu item "File-Open" is "mac_file_open", and the corresponding logical name for the sub-menu item "Tools-Open Plugin" will be "mac_tools_open", where the process or module looks up the name "open" and respectively appends it to "mac_file" and "mac_tools" to come up with two distinct logical names.

At 906, the process or hardware module for implementing an AUT testing or verification with automated synchronization comprises a process or module for mapping each of the one or more menu items identified at 902 to a corresponding logical name that is identified or determined at 904 in the single embodiment or in some embodiments.

Figure 10:
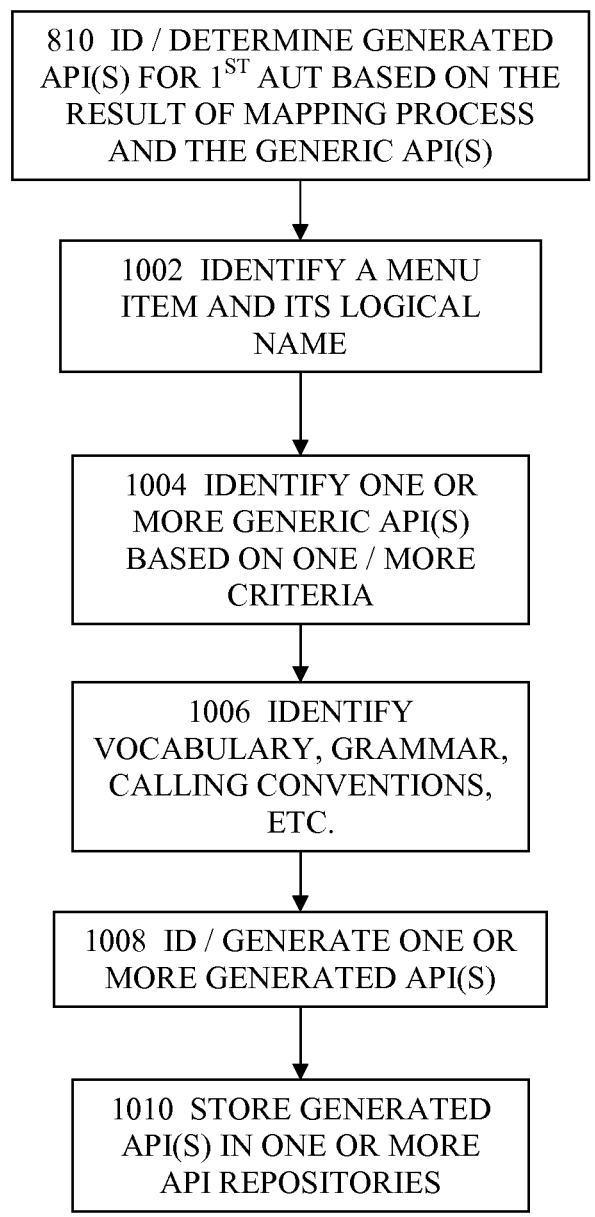
FIG. 10 illustrates more details for the process or module for identifying or determining generated API(s) for an AUT based on the result(s) generated by the mapping process and the generic API(s).

Referring to FIG. 10 which illustrates more details for the process or module 810 for identifying or determining one or more generated APIs for an AUT based on the result(s) generated by the mapping process and the generic API(s). At 1002, the process or module 810 for identifying or determining one or more generated APIs for an AUT comprises a respective process or module for identifying a menu item and its logical name for the AUT in the single element or in some embodiments.

At 1004, the process or module 810 for identifying or determining one or more generated APIs for an AUT comprises a respective process or module for identifying one or more generic APIs that may be used, modified, or extended for the one or more generated APIs based at least on part upon one or more criteria in the single embodiment or in some embodiments. In one or more embodiments, the criteria comprises the specific type(s) of operations that the AUT is to be tested for.

For example, testing an application that needs to open a file more likely requires to bring up the "File menu" with the sub-menu item "Open" in the main display window. In one or more embodiments, the criteria may also comprise heuristics to look for specific generic APIs that may be used for identifying or determining one or more generated APIs. In these embodiments, the process or the module iteratively looks for the generic APIs, and during one iteration the process or module is based on the previous iteration.

In the above example, after the process or module invokes or activates the File-Open menu item, the next iteration may look for generic APIs that may be associated with a dialog window showing list of files to be open for further testing. In some embodiments, the process or module may be operatively coupled with an expert system, a knowledge base, an artificial intelligence process or module such as an artificial neural network, or a process or module with supervised or unsupervised learning capabilities to identify the desired generic APIs. In these embodiments, the identified generic APIs may be subsequently provided to the process or module as training examples such that the process or module may learn and fine tune it logic to improve the accuracy of the identification of the desired generic APIs.

At 1006, the process or module 810 for identifying or determining one or more generated APIs for an AUT comprises a respective process or module for identifying a set of schemes for determining or identifying the one or more generated APIs for the AUT in the single embodiment or in some embodiments. In some embodiments, the set of schemes comprise vocabularies of the language suitable for creating the one or more generated APIs for the system(s) or software for testing or verifying the AUT. In some embodiments, the set of schemes may further comprise grammar(s), calling conventions, or one or more static or dynamic libraries for the generated APIs for the system(s) or software for testing or verifying the AUT.

In some embodiments, the set of schemes may be implementation specific. That is, in these embodiments, the set of schemes depends on the specific hardware systems or platforms, the operation systems running on the specific hardware systems or platforms, and the language(s) used to implement the generated APIs. In some embodiments, the set of schemes are generically defined. That is, in these embodiments, the set of schemes is independent of or not bound to a specific implementation of the generated APIs or a specific platform or software. In some embodiments, the set of schemes is neither implementation specific nor implementation independent. In these embodiments, the set of schemes may be applied to and implemented in such a way that the set of schemes may be called by a plurality of processes or a plurality of different platforms.

At 1008, the process or module 810 for identifying or determining one or more generated APIs for an AUT comprises a respective process or module for identifying or generating the one or more generated APIs in the single embodiment or in some embodiments. In some embodiments, the respective process or module for identifying or generating the one or more generated APIs is based at least in part on one or more generic APIs or the set of schemes.

Moreover, the respective process or module for identifying or generating the one or more generated APIs may comprise using the logical names or one or more generic APIs, declaring variables, modifying various structs or classes, defining or extending methods, defining actions, calling external functions, or referencing or calling one or more static or dynamic libraries, etc. In some embodiments, a generated API may include the specification or modified specification for one or more routines, one or more data structures, one or more object classes or structs, or one or more common protocols.

At 1010, the process or module 810 for identifying or determining one or more generated APIs for an AUT comprises a respective process or module for storing the one or more generated APIs in one or more API repositories in the single embodiment or in some embodiments. In some embodiments, depending upon the implementation of the generated APIs as presented in the process or module 1006, the one or more generated APIs may be reused by a different process operating on the same or a different platform or by the same process operating on the same or a different platform.

In some embodiments, the one or more generated APIs may be bundled in one or more existing libraries of the software for AUT testing or verification or in one or more existing libraries of some other software packages running on one or more platforms. For example, the one or more generated APIs may be included in one or more libraries such as, but not limited to, the math.h for the C programming language containing the definitions of the mathematical functions in the C language library (libm) for mathematical processing. In some embodiments, the one or more generated APIs may include description of how to use various functions or other constituents of the generated APIs or expected results for the invocation or calling of functions.

In some embodiments, a generated API may comprise a description of a set of classes or structs with a set of behaviors associated with the set of classes or structs. In some embodiments, the behavior is a description of how an object derived from the class will function in given circumstances. Moreover, a generated API comprises the totality of all the methods exposed by the classes or structs and prescribes one or more methods by which objects that are derived from the class or struct definition may be handled in the single embodiment or in some embodiments.

In some embodiments, a generated API represents a collection of all objects, which may be derived from the class or struct definition, and their respective associated, possible behavior in a plurality of circumstances. In some embodiments, a generated API comprises a class or struct interface which defines no methods for handling objects that are derived from the class or struct definition. Rather, the class or struct interface may define behaviors of objects derived from the class or struct definition in these embodiments. For example, a generated API for open classes or structs that contain simple data but not links to external resources such as an open connection to a file, a remote system, or an external device is an example of this type of generated APIs in some embodiments. In addition, some of the generated APIs may be implemented as application binary interfaces (ABIs) which comprise a lower level definition concerning details at, for example, the assembly language level.

Figure 11:
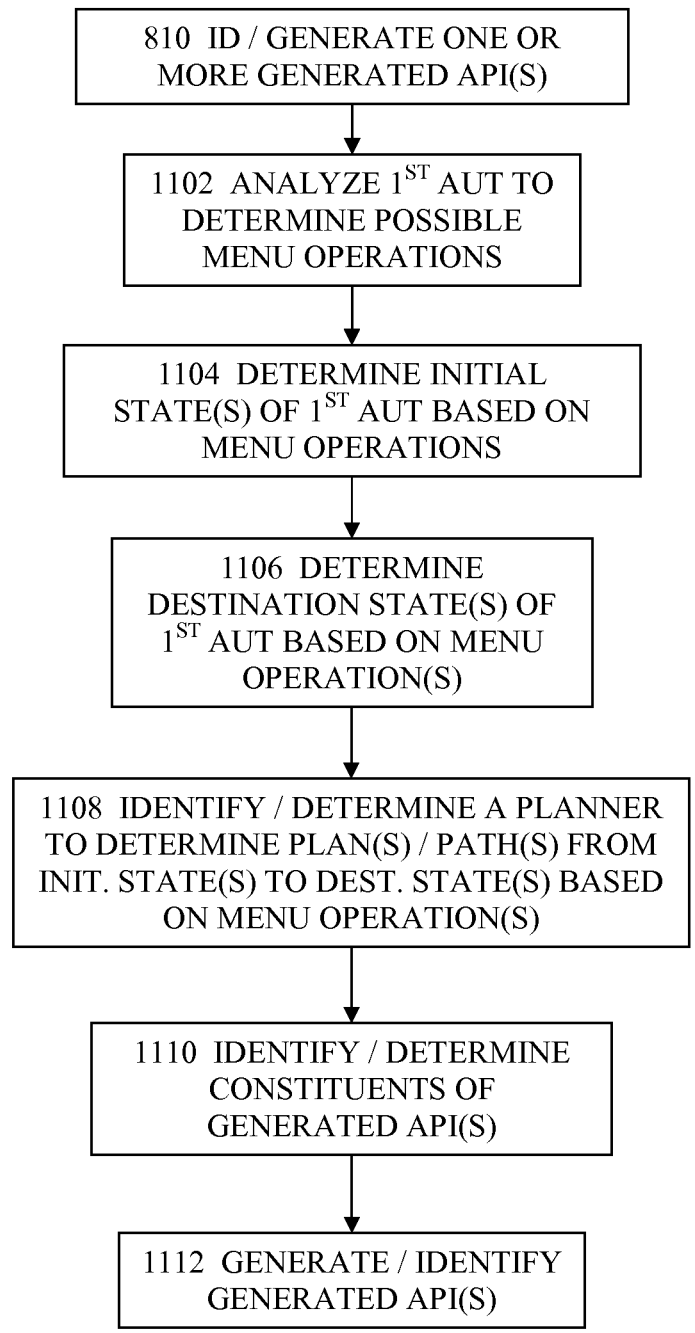
FIG. 11 illustrates more details for the process or hardware module for identifying or determining one or more generated APIs.

FIG. 11 illustrates more details for the process or hardware module for the process or module for identifying or determining one or more generated APIs of 810. At 1102, the process or module 810 for identifying or determining one or more generated APIs for an AUT comprises a respective process or module for analyzing the first AUT to determine possible operations for the first AUT in the single embodiment or in some embodiments. At 1104, the process or module 802 for identifying or determining one or more generated APIs for an AUT comprises a respective process or module for determining one or more initial states of the first AUT based at least on the possible operations for the first AUT determined at 1102 in the single embodiment or in some embodiments.

At 1106, the process or module 802 for identifying or determining one or more generated APIs for an AUT comprises a respective process or module for determining one or more corresponding destination states of the first AUT based at least in part upon the possible operations for the first AUT that are determined at 1102 in the single embodiment or in some embodiments. At 1108, the process or module 802 for identifying or determining one or more generated APIs for an AUT comprises a respective process or module for identifying or determining a planner to determine one or more plans or one or more paths from the one or more initial states to the one or more corresponding destination states in the single embodiment or in some embodiments. In some embodiments, the respective process or module determines or identifies the planner based at least in part upon the possible operations for the first AUT that are determined at 1102.

In some embodiments, the respective process or module for identifying or determining a planner at 1108 further comprises a process or module for determining an order among the possible operations determined at 1102. The process or module 1108 may optionally consider various experience levels of the users of the first AUT or their respective possible operations in manipulating or using the first AUT in identifying or determining the planner in some embodiments. In some embodiments, the process or module 1108 may identify or determine the planner by using a search process or technique to find exact or approximate solutions for the planner, the plans, or the paths. In some embodiments, the search process or technique comprises an evolutionary algorithm or process such as, but not limited to, a genetic algorithm or search heuristics which start with a collection of candidate solutions, which may be predetermined or randomly generated, for the planner, plan(s), or path(s) and iteratively evolve towards better solution(s) by stochastically selecting and modifying one or more candidate solutions.

For example, the process or module 1108 may consider a narrower range of possible operations or manipulations of the AUT for more experienced or advanced users to determine or identify the possible plans or paths from the initial states to the corresponding destination states in some embodiments. In this example, more experienced or advanced users are considered more familiar with either the AUT or other similar systems or packages in general and thus their operations or manipulations of the AUT are more likely to be more reasonable or predictable and hence the narrower range of possible operations or manipulations.

In some other embodiments, the process or module 1108 may consider a broader range of possible operations or manipulations of the AUT for less experienced or novice users. In these embodiments, the less experienced or novice users are considered less familiar with the AUT or other similar systems or packages and are thus more likely to perform some operations or manipulations that are less likely to come from more experienced users. For example, the less experienced or novice users are more likely to click on some other features or items before clicking on the correct feature or item to achieve his or her intended purpose. The process or module 1108 may be devised to test such situations to ensure that the AUT would be functioning normally even in those situations. In some embodiments, the process or module 1108 may further consider "monkey" user behaviors in operating or manipulating the AUT and devise fully automated "monkey testing" to ensure that the AUT will still be functioning normally even in those situations.

In some embodiments, the process or module 1108 may also comprise the process or module for constructing an event-flow graph or a control-flow graph based at least in part upon the one or more plans or paths that were determined or identified at 1106. In some embodiments, the event-flow graph or the control-flow graph represents the one or more plans or paths between the initial state(s) and the destination state(s) using a graph notation that may be traversed by the verification or testing process or system for the first AUT. In some other embodiments, the event-flow graph or the control-flow graph represents the one or more plans or paths between the initial state(s) and the destination state(s) using a link structure, a symbol structure, or a set of pointers rather than using a graph notation.

At 1110, the process or module 802 for identifying or determining one or more generated APIs for an AUT comprises a respective process or module for identifying or determining one or more constituents that may be used in the one or more generated APIs in the single embodiment or in some embodiments. At 1112, the process or module 802 for identifying or determining one or more generated APIs for an AUT comprises a respective process or module for generating or identifying the one or more generated APIs using at least the one or more constituents in the single embodiment or in some embodiments.

Figure 12:
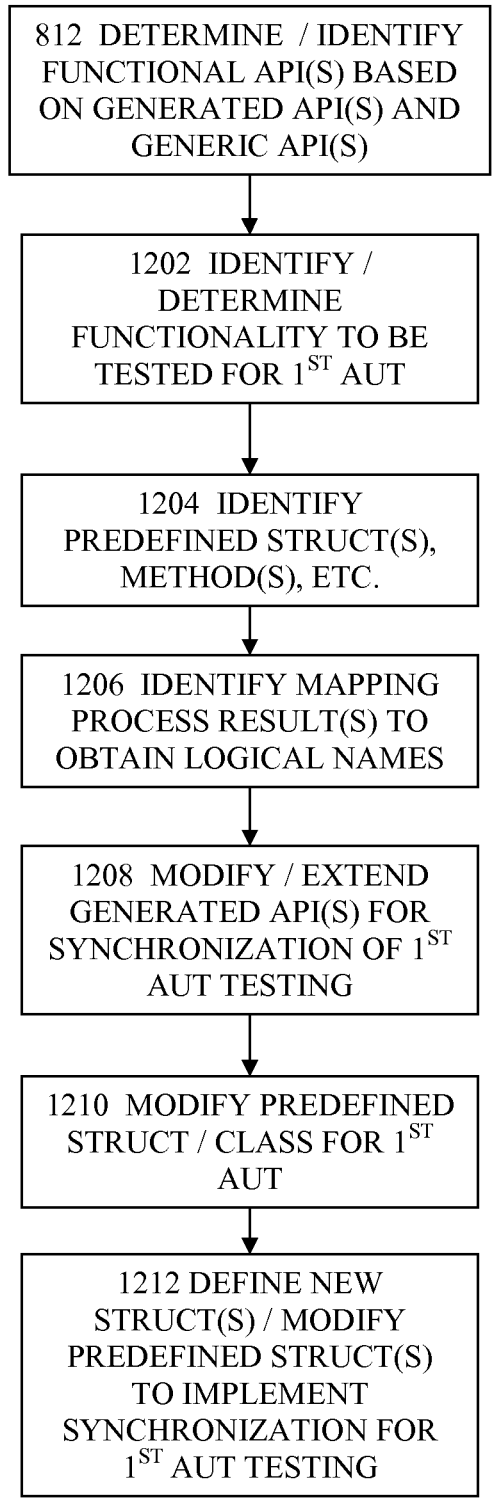
FIG. 12 illustrates more details for the process or hardware module for identifying or determining one or more functional APIs based on one or more generated APIs and one or more generic APIs.

FIG. 12 illustrates more details for the process or hardware module for identifying or determining one or more functional APIs based on one or more generated APIs and one or more generic APIs. More particularly, FIG. 12 illustrates more details for the process or module 812 for determining or identifying one or more functional APIs based at least in part on one or more generated APIs and one or more generic APIs. In some embodiments, the process of determining or identifying functional APIs may be performed by a user so as to allow the user greater capabilities to create custom, functional APIs for specific purposes.

At 1202, the process or hardware module for identifying or determining one or more functional APIs comprises the respective process or module for identifying or determining the functionality to be tested for the first AUT in the single embodiment or in some embodiments. In some embodiments, the process or hardware module of 1202 performs the intended function by considering one or more factors. In some embodiments, the one or more factors comprise the domain size in determining or identifying the functionality to be tested. In some embodiments, the one or more factors comprise the sequence(s) of the testing or verification in its determination or identification of the functionality to be tested. For example, if the process or the module determines that the domain size is limited the process or the module may then identify or determine the more important functionality to be tested while ignoring some less important or less error-prone functionality for the testing or verification.

At 1204, the process or hardware module for identifying or determining one or more functional APIs comprises the respective process or module for identifying one or more structs or classes, one or more objects, or one or more methods based at least in part on the identified or determined functionality to be tested in the single embodiment or in some embodiments. In some embodiments, the one or more structs or classes, one or more objects, or the one or more methods may be directly used in the generation of functional APIs. In some embodiments, the one or more structs or classes, one or more objects, or the one or more methods may be modified or extended when they are used in the generation of functional APIs. At 1206, the process or hardware module for identifying or determining one or more functional APIs comprises the respective process or module for identifying the mapping process result(s) to identify the logical names that are to be used in various APIs.

At 1208, the process or hardware module for identifying or determining one or more functional APIs comprises the respective process or module for modifying or extending one or more generated APIs for synchronization in the testing or verification of the first AUT in the single embodiment or in some embodiments. At 1210, the process or hardware module for identifying or determining one or more functional APIs comprises the respective process or module for modifying one or more predefined structs or classes for the testing or verification of the first AUT in the single embodiment or in some embodiments. At 1212, the process or hardware module for identifying or determining one or more functional APIs comprises the respective process or module for defining one or more new structs or classes or modifying one or more predefined structs or classes to implement synchronization for the testing or verification of the first AUT in the single embodiment or in some embodiments.

The following exemplary code illustrates an example for the process for identifying or determining one or more functional APIs.

```
extend mac_main_window {
    post_init( ) is also {
        get_open_dialog_menu_item( ).add_synchronizer(new
        my_synchronizer);
    };
};
extend sys {
    get_mac_full_title( ): string is {
        var title: string = mac.get_mac_main_window( ).get_title( );
        return append("MAC ", title);
    };
};
struct my_ synchronizer like gtx_base_synchronizer {
    post__menu_item__click(mi: menu_item) is {
        var full_title: string = sys.get_mac_full_title( );
        if (full_title == my_name) {
            mac.wait_for_window(mac_file_dialog);
        };
    };
};
```

In the above exemplary code for the process for identifying or determining one or more functional APIs, "post_init( ) is also", "add_synchronizer( )", "sys", "get_title( )", "gtx_base_synchronizer", "post_menu_item_click(mi: menu_item) is", and "wait_for_window" constitute the generic or predefined APIs that are incorporated in various generated API(s) or custom functional API(s).

In addition, "mac_main_window", "get_open_dialog_menu_item( )", "get_mac_main_window", and "mac_file_dialog" constitute the generated APIs that are automatically generated by some processes or modules as described in some of the preceding paragraphs.

Moreover, "extend mac_main_window { . . . }", "my_synchronizer", "extend sys { . . . }", and "struct my_synchronization like . . . { . . . }" constitute the custom functional APIs. More specifically, the "get_opn_dialog_menu_item( ).add_synchronizer (new my_synchronzier)" defines a custom functional API by utilizing the generated API "get_open_dialog_menu_item( )" and the predefined or generic API "add_synchronizer( )".

In the above exemplary code, "extend sys { . . . } extends "sys" to define the "get_mac_full_title( )" method with a string return type while passing no parameter. The actions in this extended struct "sys" contain "var title: string=mac.get_mac_main_window( ).get_title( )" where "get_mac_main_window( )" constitutes a generated API, and "get_title( )" constitutes a predefined or generic API. The remainder portion of "extend sys" constitutes the custom functional API constituents of the custom functional API "extend sys".

The "struct my_synchronizer like gtx_base_synchronizer { . . . } represents another part of a custom functional API, where "gtx_base_synchronizer{ }", "post_menu_item_click (mi: menu_item) is { }", and "wait_for_window" constitute the predefined or generic APIs. The "mac-file_dialog" constitutes the generic or predefined API. The remainder portion within the "struct my_synchronizer like . . . " constitutes the custom function API constituents. Moreover, "post_menu_item_click(mi: menu_item) is { . . . }" defines the post_menu_item method according to the syntax of method-name ([parameter-list]) [:return-type] is [inline] {action; . . . }, where the return type is "menu_item" and the parameter list is "mi". "var full_title: string=sys.get_mac_full_title( );" constitutes an action by declaring the variable "full_title" according to the syntax var name: [[list of] type][=exp] with a string variable type and sys.get_mac_full_title( ) as the expression which is defined in "extend sys" above.

Furthermore, "if (full_title==my_name) {mac.wait_for_window(mac_file_dialog);} constitutes the functional API part based on the predefined or generic API "wait_for_window" and a generated API "mac_file_dialog". The if ( . . . ) { . . . } action waits for the return result of mac.wait_for_window(mac_file_dialog) according to the syntax if Boolean-exp [then] {action; . . . } [else if Boolean-exp [then]{action; . . . } [else {action; . . . }], where mac is defined in "extend sys".

The following exemplary code represents another example of custom functional APIs that may be generated in accordance with various embodiments as disclosed herein.

```
extend sys {
    run( ) is also {
        var mac: mac_app=launch_mac( );
        var                      main_window:
            mac_main_window=mac.get_main_window( );
        main_window.load_run("my_file.txt");
        main_window.switch_to_module_attributes( );
        main_window.quit( );
    };
};
```

In the above exemplary code, mac is the name of the AUT, and "run( ) is also { . . . }" appends the actions above to the end of run method. "var mac: mac_app=launch_mac( )" defines a variable—mac—to be mac_app. This does the launching of the mac AUT. "var main_window: mac_main_window= mac.get_main_window( )" defines the main window application where the application is an entity, and the window is also an entity. "main_window.load_run("my_file.txt")" loads a new run where "my_file.txt" is the file to load for testing or verification. "main_window.switch_to_module_attributes( )" represents the functional API performing a sequence of steps of switching to a module tab in the main window. "main_window.quit( )" represents the custom functional API which constitutes a logical operation to simulate, for example, "File—Exit (or Quit or Close)".

System Architecture Overview

Figure 13:
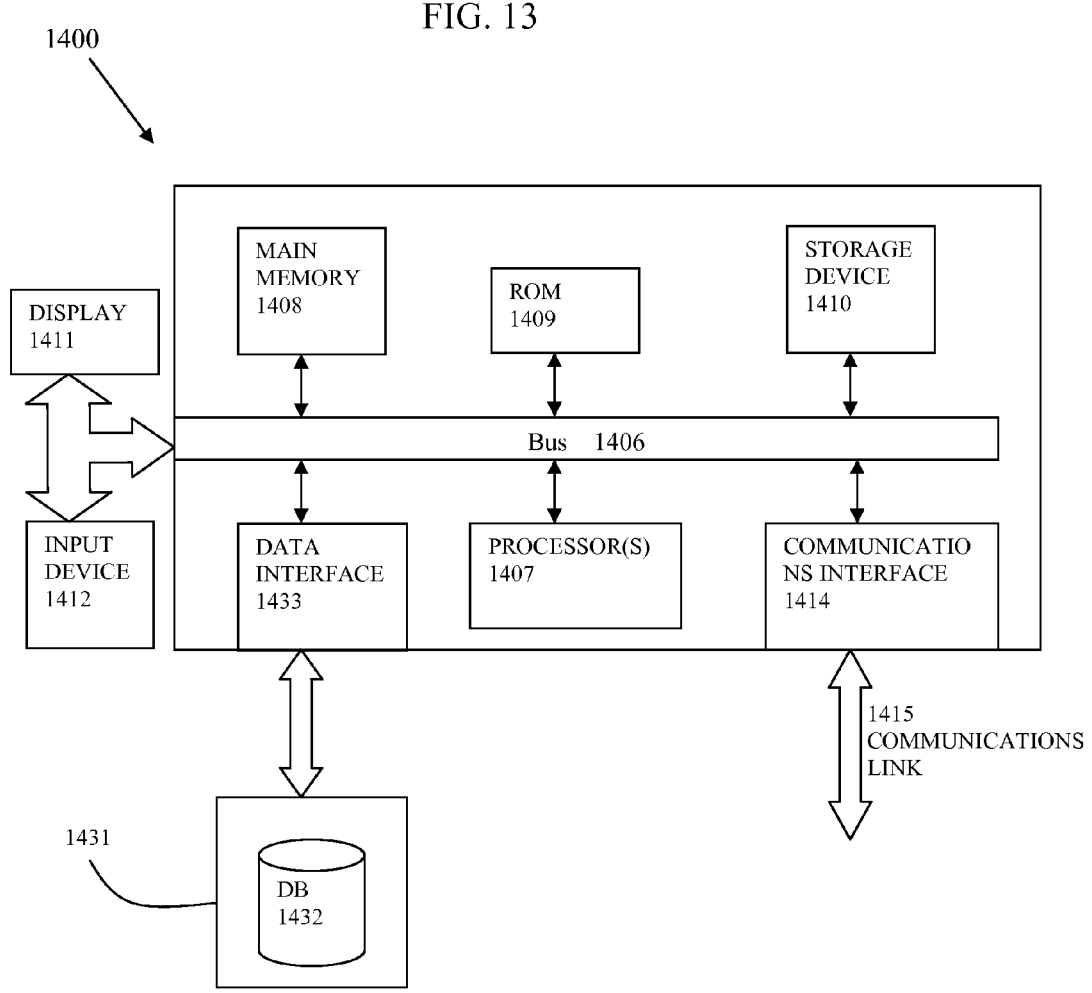
FIG. 13 illustrates a block diagram of an illustrative computing system 1400 suitable for implementing various embodiments of the invention.

FIG. 13 illustrates a block diagram of an illustrative computing system 1400 suitable for implementing various embodiments of the invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control (not shown).

According to one embodiment of the invention, computer system 1400 performs specific operations by one or more processors or processor cores 1407 executing one or more sequences of one or more instructions contained in system memory 1408. Such instructions may be read into system memory 1408 from another computer readable/usable storage medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software.

In one embodiment, the term "logic" shall mean any combination of software or hardware that is used to implement all or part of the invention. In the single embodiment or in some embodiments, the one or more processors or processor cores 1407 may be used to perform various acts such as various acts involving determining, identifying, analyzing, generating, establishing, registering, causing to activate, simulating, etc. In some embodiments, at least one of the one or more processors or processor cores 1407 has the multithreading capability to execute a plurality of threads to perform various tasks as described in the preceding sections.

Various actions as described in the preceding paragraphs may be performed by using one or more processors, one or more processor cores, or combination thereof 1407.

The term "non-transitory computer readable storage medium" or "non-transitory computer usable storage medium" as used herein refers to any non-transitory medium that participates in providing instructions to processor 1407 for execution. Such a non-transitory medium may take many forms, including but not limited to, non-volatile media and volatile media. Non-volatile media includes, for example, optical or magnetic disks, such as disk drive 1410. Volatile media includes dynamic memory, such as system memory 1408.

Common forms of non-transitory computer readable storage media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals that include data streams representing various types of signal information, e.g., instructions, messages and data. In embodiments of the invention, the functions of the data interface 1433 may be performed by the communication interface 1414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for synchronizing a software verification flow of a first application under test, comprising:
    using a computer system which comprises at least one processor and is programmed for performing:
        identifying one or more generic application programming interfaces;
        applying a mapping process to the first application under test;
        identifying a set of one or more schemes;
        generating one or more generated application programming interfaces using at least one scheme in the set of one or more schemes based at least in part upon the one or more generic application programming interfaces and the mapping process, wherein
            a first generated application programming interface of the one or more generated application programming interfaces corresponds to at least one synchronizer that synchronizes at least one operation associated with the first generated application programming interface for the verification flow, without using a time-based delay or wait statements to cause the verification flow to wait for a particular state to proceed with the verification flow.

2. The computer implemented method of claim 1, further comprising:
    generating one or more custom application programming interfaces based at least in part upon at least one of the one or more generated application programming interfaces.

3. The computer implemented method of claim 1, further comprising:
    implementing synchronization in at least one of the one or more generated application programming interfaces or the one or more custom application programming interfaces.

4. The computer implemented method of claim 1, wherein the act of applying the mapping process to the first application under test comprises:
    identifying a menu item for the first application under test;
    identifying or determining a logical name; and mapping the menu item to the logical name.

5. The computer implemented method of claim 4, wherein the act of generating the one or more generated application programming interfaces comprises:
    identifying a set of schemes;
    generating the one or more generated application interfaces based at least in part upon the logical name and the set of schemes.

6. The computer implemented method of claim 5, wherein set of schemes comprises a set of vocabularies or a set of grammars of a language for generating the one or more generated application programming interfaces or a set of calling conventions.

7. The computer implemented method of claim 1, wherein the act of identifying the one or more generic application programming interfaces comprises:
    iteratively searching for a generic application programming interface during a current iteration based at least in part upon a search result of a prior iteration and an intended purpose of the one or more generated application programming interfaces.

8. The computer implemented method of claim 5, wherein the set of schemes is implementation specific.

9. The computer implemented method of claim 5, wherein the set of schemes is generically defined.

10. The computer implemented method of claim 1, wherein the act of generating the one or more generated application programming interfaces comprises:
    determining a possible menu operation by analyzing the first application under test;
    determining an initial state and a destination state of the first application under test based at least in part on the possible menu operation;
    identifying or determining a planner for the initial state and the destination state; and
    identifying or determining one or more constituents of the one or more generated application programming interfaces.

11. The computer implemented method of claim 10, wherein the act of determining a possible menu operation is performed by considering an experience level of a user.

12. The computer implemented method of claim 2, wherein the act of generating the one or more custom application programming interfaces comprises:
    identifying or determining a functionality to be tested or verified for the first application under test;
    identifying one or more entities for the first application under test; and
    modifying at least one of the one or more entities for synchronization.

13. The computer implemented method of claim 12, wherein the act of modifying the at least one of the one or more entities is based at least in part upon a result of the act of applying the mapping process to the first application under test.

14. The computer implemented method of claim 12, wherein the one or more entitles comprise at least one of one or more predefined methods, one or more classes or objects, the one or more generic application programming interfaces, and the one or more generated application programming interfaces.

15. The computer implemented method of claim 10, wherein the act of identifying or determining the planner comprises performing a search process or technique.

16. The computer implemented method of claim 15, wherein the search process or technique comprises an evolutionary process or search heuristics.

17. The computer implemented method of claim 15, wherein the search process or technique comprises:
    starting with a collection of candidate planners, wherein
        the collection of candidate planners are predetermined or randomly generated, and
        the collection of candidate planners comprise one or more exact planners, one or more approximate planners, or a combination of at least one of the one or more exact planners and at least one of the one or more approximate planners; and
    iteratively evolving towards the planner.

18. The computer implemented method of claim 12, wherein the act of identifying or determining a functionality to be tested or verified is performed based at least in part upon a domain size for the software verification flow.

19. A machine for synchronizing a software verification flow of a first application under test, the machine comprising:
    a computer system which comprises at least one processor and is at least to:
        identify one or more generic application programming interfaces;
        apply a mapping process to the first application under test; and
        identify a set of one or more schemes;
        generate one or more generated application programming interfaces using at least one scheme in the set of one or more schemes based at least in part upon the one or more generic application programming interfaces and the mapping process to the first application under test, wherein
            a first generated application programming interface of the one or more generated application programming interfaces corresponds to at least one synchronizer that synchronizes at least one operation associated with the first generated application programming interface for the verification flow, without using a time-based delay or wait statements to cause the verification flow to wait for a particular state to proceed with the verification flow.

20. The machine of claim 19, the computer system is at least further to:
    generate one or more custom application programming interfaces based at least in part upon at least one of the one or more generated application programming interfaces; or
    implement synchronization in at least one of the one or more generated application programming interfaces or the one or more custom application programming interfaces.

21. The machine of claim 19, the computer system that is to apply the mapping process to the first application under test is further to:
    identify a menu item for the first application under test;
    identify or determine a logical name; and
    map the menu item to the logical name, wherein the computer system that is to generate the one or more generated application programming interfaces is further to:
        identify a set of schemes; and
        generate the one or more generated application interfaces based at least in part upon the logical name and the set of schemes.

22. The machine of claim 19, wherein the computer system that is to identify the one or more generic application programming interfaces is further to:
    iteratively search for a generic application programming interface during a current iteration based at least in part upon a search result of a prior iteration and an intended purpose of the one or more generated application programming interfaces.

23. The machine of claim 19, wherein the computer system that is to generate the one or more generated application programming interfaces is further to:
   determine a possible menu operation by analyzing the first application under test;
   determine an initial state and a destination state of the first application under test based at least in part on the possible menu operation;
   identify or determine a planner for the initial state and the destination state; and
   identify or determine one or more constituents of the one or more generated application programming interfaces.

24. The machine of claim 19, wherein the computer system that is to generate the one or more generated application programming interfaces is further to:
   perform a search process or technique, wherein the search process or technique comprises:
      starting with a collection of candidate planners, wherein
         the collection of candidate planners are predetermined or randomly generated, and
         the collection of candidate planners comprise one or more exact planners, one or more approximate planners, or a combination of at least one of the one or more exact planners and at least one of the one or more approximate planners; and
      iteratively evolving towards the planner.

25. An article of manufacture of a computer program product comprising a non-transitory computer readable storage medium having a sequence of instructions which, when executed by a computer system, cause one or more processors, processor cores, or combinations thereof to execute a process for synchronizing a software verification flow of a first application under test, the process comprising:
   using the computer system which comprises at least one processor and is configured for performing a second process of:
      identifying one or more generic application programming interfaces;
      applying a mapping process to the first application under test; and
      identifying a set of one or more schemes;
      generating one or more generated application programming interfaces using at least one scheme in the set of one or more schemes based at least in part upon the one or more generic application programming interfaces and the mapping process, wherein
         a first generated application programming interface of the one or more generated application programming interfaces corresponds to at least one synchronizer that synchronizes at least one operation associated with the first generated application programming interface for the verification flow, without using a time-based delay or wait statements to cause the verification flow to wait for a particular state to proceed with the verification flow.

26. The article of manufacture of claim 25, the process further comprising one or more of:
   generating one or more custom application programming interfaces based at least in part upon at least one of the one or more generated application programming interfaces; and
   implementing synchronization in at least one of the one or more generated application programming interfaces or the one or more custom application programming interfaces.

27. The article of manufacture of claim 25, the process comprising the act of applying the mapping process to the first application under test further comprising:
   identifying a menu item for the first application under test;
   identifying or determining a logical name; and
   mapping the menu item to the logical name, wherein the act of generating the one or more generated application programming interfaces comprises:
      identifying a set of schemes; and
      generating the one or more generated application interfaces based at least in part upon the logical name and the set of schemes.

28. The article of manufacture of claim 25, wherein the process comprising the act of identifying the one or more generic application programming interfaces further comprises:
   iteratively searching for a generic application programming interface during a current iteration based at least in part upon a search result of a prior iteration and an intended purpose of the one or more generated application programming interfaces.

29. The article of manufacture of claim 25, wherein the process comprising the act of generating the one or more generated application programming interfaces further comprises:
   determining a possible menu operation by analyzing the first application under test;
   determining an initial state and a destination state of the first application under test based at least in part on the possible menu operation;
   identifying or determining a planner for the initial state and the destination state; and
   identifying or determining one or more constituents of the one or more generated application programming interfaces.

30. The article of manufacture of claim 25, wherein the process comprising the act of generating the one or more generated application programming interfaces further comprises:
   performing a search process or technique, wherein the search process or technique comprises:
      starting with a collection of candidate planners, wherein
         the collection of candidate planners are predetermined or randomly generated, and
         the collection of candidate planners comprise one or more exact planners, one or more approximate planners, or a combination of at least one of the one or more exact planners and at least one of the one or more approximate planners; and
      iteratively evolving towards the planner.

* * * * *